(12) United States Patent
Eberhard et al.

(10) Patent No.: US 7,240,350 B1
(45) Date of Patent: *Jul. 3, 2007

(54) SYSTEM AND METHOD FOR PROVIDING COMMUNICATIONS TO PROCESSES

(75) Inventors: Martin Eberhard, Woodside, CA (US); Bob Felderman, Portola Valley, CA (US); Van Jacobson, Woodside, CA (US)

(73) Assignee: SLT Logic, LLC, Boston, MA (US)

( * ) Notice: Subject to any disclaimer, the term of this patent is extended or adjusted under 35 U.S.C. 154(b) by 351 days.

This patent is subject to a terminal disclaimer.

(21) Appl. No.: 10/418,587

(22) Filed: Apr. 17, 2003

Related U.S. Application Data

(63) Continuation-in-part of application No. 10/042,971, filed on Jan. 7, 2002.

(60) Provisional application No. 60/441,823, filed on Jan. 22, 2003, provisional application No. 60/375,880, filed on Apr. 25, 2002, provisional application No. 60/373,745, filed on Apr. 17, 2002.

(51) Int. Cl.
*G06F 9/44* (2006.01)

(52) U.S. Cl. ............... 719/314; 719/310; 719/315; 709/231

(58) Field of Classification Search ................ 718/102; 719/310–316; 709/201–203, 230–232
See application file for complete search history.

(56) References Cited

U.S. PATENT DOCUMENTS

| | | | |
|---|---|---|---|
| 5,367,681 A | 11/1994 | Foss et al. | |
| 5,437,031 A | 7/1995 | Kitami | |
| 5,761,534 A * | 6/1998 | Lundberg et al. | 710/50 |
| 6,032,179 A | 2/2000 | Osborne | |
| 6,246,683 B1 | 6/2001 | Connery et al. | |
| 6,345,327 B1 * | 2/2002 | Baskey et al. | 710/52 |
| 6,457,042 B1 * | 9/2002 | Czaykowski et al. | 709/203 |
| 6,519,686 B2 | 2/2003 | Woodring et al. | |
| 6,711,607 B1 * | 3/2004 | Goyal | 709/203 |
| 6,742,063 B1 | 5/2004 | Hellum et al. | |
| 6,829,769 B2 * | 12/2004 | Cranston et al. | 719/312 |
| 6,938,085 B1 * | 8/2005 | Belkin et al. | 709/227 |
| 6,947,425 B1 * | 9/2005 | Hooper et al. | 370/394 |
| 7,012,918 B2 | 3/2006 | Williams | |
| 7,051,108 B1 | 5/2006 | Jones et al. | |
| 2005/0138624 A1 * | 6/2005 | Morrison et al. | 718/102 |

OTHER PUBLICATIONS

Paradigms for process interaction in distributed programs, Andrews, ACM Computing Surveys (CSUR) vol. 23, Issue 1 (Mar. 1991) pp. 49-90 ACM Press.*

A common multi-agent testbed for diverse seamless personal information networking applications, Abu-Hakima et al., Communications Magazine, IEEE Jul. 1998 vol. 36, Issue: 7 On pp. 68-74.*

* cited by examiner

*Primary Examiner*—Van Nguyen
(74) *Attorney, Agent, or Firm*—Patterson, Thuente, Skaar & Christensen, P.A.

(57) ABSTRACT

A system and method provides communications to processes, handles transmissions of communications received from processes, and allows other manipulations of transmissions upon request by processes without an operating system call.

13 Claims, 12 Drawing Sheets

SYSTEM AND METHOD FOR PROVIDING COMMUNICATIONS TO PROCESSES

RELATED APPLICATIONS

This application claims the benefit of application Ser. No. 60/441,823 entitled, "Method and Apparatus for Providing Communications to Processes" filed on Jan. 22, 2003 by Martin Eberhard, Bob Felderman and Van Jacobson, application Ser. No. 60/375,880 entitled "METHOD AND APPARATUS FOR EFFICIENT INPUT/OUTPUT OF A COMPUTER SYSTEM" filed on Apr. 25, 2002 by Bob Felderman, Van Jacobson, and Martin Eberhard, and application Ser. No. 60/373,745 filed on Apr. 17, 2002 by Martin Eberhard, and is a continuation in part of application Ser. No. 10/042,971 entitled, "SYSTEM AND METHOD FOR EFFICIENT INPUT/OUTPUT OF A COMPUTER SYSTEM" filed on Jan. 7, 2002 by Van Jacobson, each having the same assignee as this application, and each is incorporated herein by reference in its entirety.

FIELD OF THE INVENTION

The present invention is related to computer input/output systems and more specifically to input/output systems for multiprocessing computer systems.

BACKGROUND OF THE INVENTION

Computers may receive communications from, and/or provide communications to, other devices. For example, computers that operate as servers for the World Wide Web may receive communications from other computer systems requesting web pages. Other computers may operate as file or storage servers for a local-area, or metropolitan, network, receiving requests for files from a computer system, retrieving the file from a storage subsystem and providing the file to the requesting computer system.

Computer systems process each communication via one or more processes running on the computer system. On many computer systems, several processes capable of processing communications may be running at any given time. Some of these simultaneously operating processes may handle certain types of communications, while other processes on the same computer system handle other types of communications.

When a conventional computer system receives a new communication of a certain type, it provides it to a process that handles that type of communications. Subsequent communications received from the same source for the same destination may be provided to the process via operating system calls made by the process to allow the same process to handle messages that are part of the same thread of communications.

However, there are several problems with this approach. One problem is that new communication threads are assigned to a process that can handle communications of that type whether the process is in the best position to receive a new communication thread. Because the process does not control the manner in which communications are assigned, one process may receive a new communication at a time that it should not, even though another process may be in a better position to receive the new communication. Additionally, the use of operating system calls to receive communications is processor intensive, which can limit the overall capacity of the computer system to process communications and perform other operations.

Some communications may be processed by one process, potentially altering the communication as a result. The resulting communications may then be processed by another process. The interprocess transfer of these communications may also require operating system calls, adding additional load to the processors on which the processes run, further limiting the capacity of the system to process communications and perform other operations. Furthermore, the process that first handles the communications may be required to identify the process that should subsequently process the communication, which adds complexity to the process, complexity that must be duplicated in each such process.

Some processes can erroneously overwrite communications provided by other processes. It can be desirable to restrict access by one process to communications written by another process.

It can be desirable to implement any solution to the problems described above in a cost-effective manner. The costs of communication interfaces such as gigabit Ethernet interfaces can be enormously sensitive to volume. Thus, it is preferable to incorporate high volume communication interfaces into any solution, than to use more expensive custom communication interfaces, which would reduce the desirability of any solution incorporating a custom communication interface.

What is needed is a system and method that can route new communications to processes under control of each process, provides communications to processes without the use of operating system calls, allows communications to be easily reassigned to other processes, restricts access by one process to communications written by another process, and uses conventional communication interfaces.

SUMMARY OF INVENTION

A system and method watches a bus being used to store the communications by a conventional communication interface, notes where the communication is stored, and either assigns the communication to a process that had received similar communications, or classifies communications according to the type of communication. A communication classified according to the type of communication is considered the first communication of a "stream", and subsequent communications having similar properties, such as communications from the same source to the same destination and having the same protocol are also identified as being a part of the same stream. When a process wishes to receive communications from a new stream, the process signals the system and method via memory, and the system and method assigns the stream to the process and provides an indication of where the desired communication is stored. The system and method maintains queues for subsequent communications that are part of a stream assigned to a process, and the process may access those queues directly to retrieve those subsequent communications. When a process completes processing one or more communications, it may signal the system and method to provide the communications in a stream to a different process, and the system and method reads the communications processed by the first process, and reclassifies them for processing by another process. To provide communications for output, the system and method provides buffer addresses in response to requests by processes, which fill the buffer and signal the system and method to provide the buffer for output. Access to buffers is restricted to ensure certain processes do not overwrite buffers in use by other processes.

DETAILED DESCRIPTION OF A PREFERRED EMBODIMENT

Prior Art: a Conventional Computer System

Figure 1:
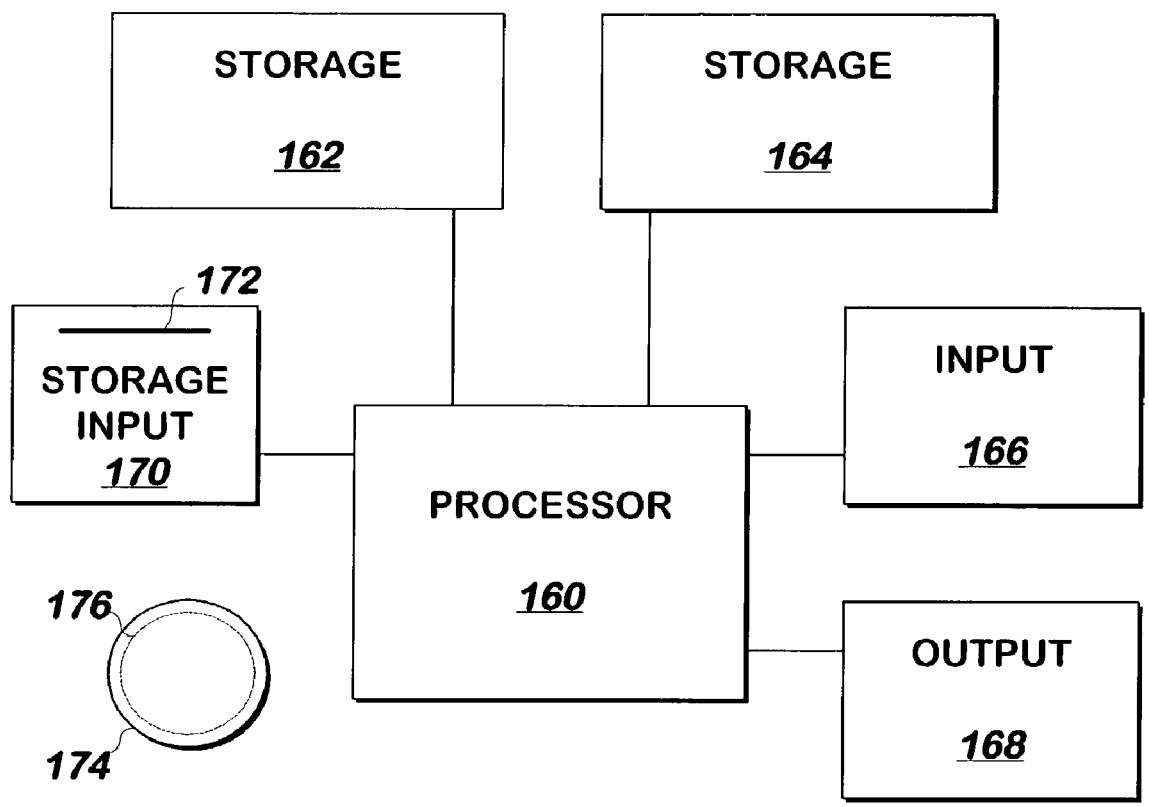
FIG. 1 is a block schematic diagram of a conventional computer system.

The present invention may be implemented as computer software running on a separate interface board with its own processor running on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or running the FreeBSD operating system commercially available from the Web site freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2:
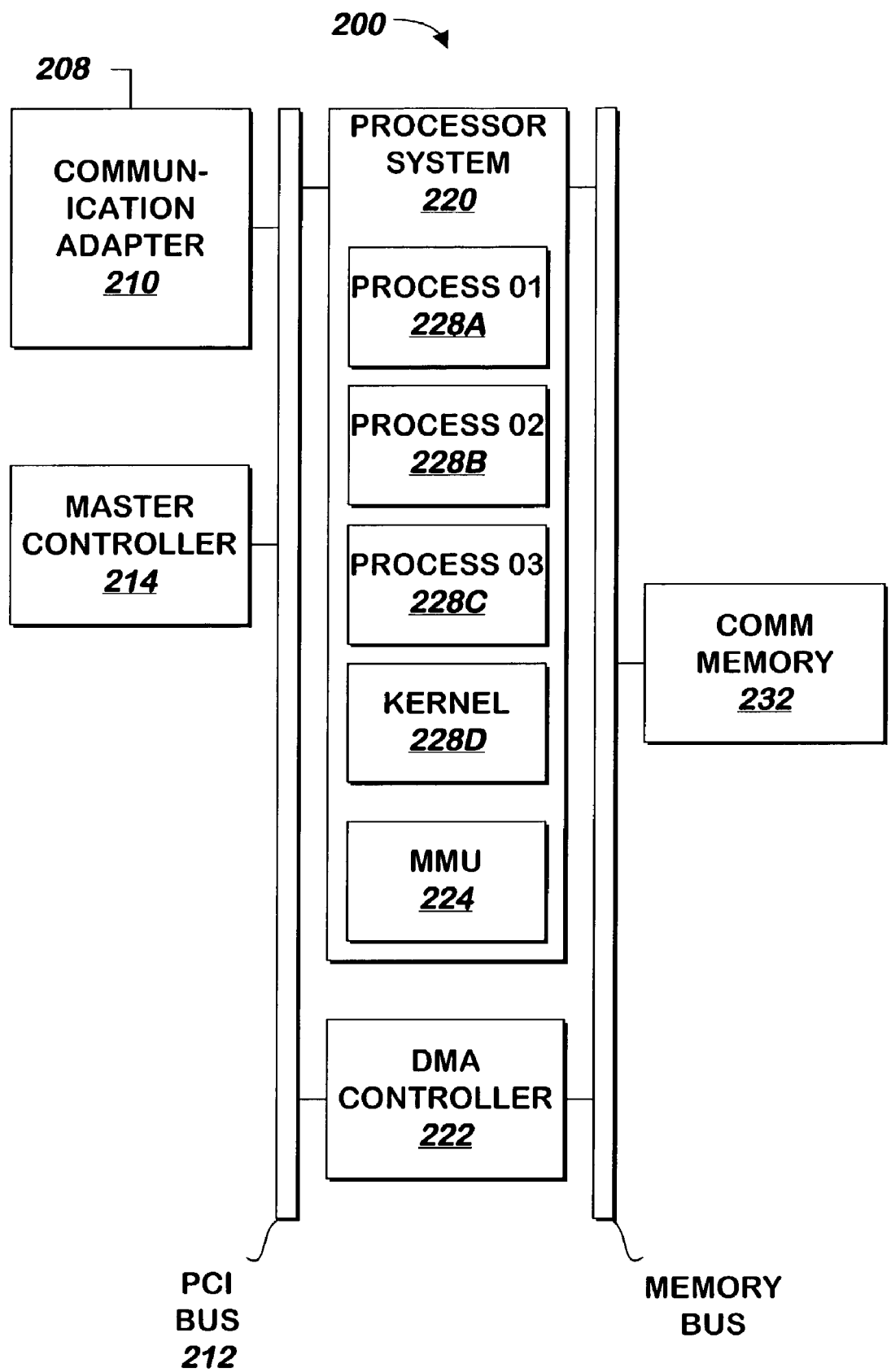
FIG. 2 is a block schematic diagram of an apparatus for providing communications to processes according to one embodiment of the present invention.

Communication Memory is Divided into Buffers and the Addresses of the Buffers are Assigned to a Descriptor Ring Referring now to FIG. 2, a system for providing communications to processes is shown according to one embodiment of the present invention. In one embodiment, communications are received and stored by a conventional communication adapter 210 into buffers in communication memory 232 as described herein. The buffers of memory are defined and made available to communication adapter 210 by a master controller 214 upon system startup as will now be described.

Figure 3A:
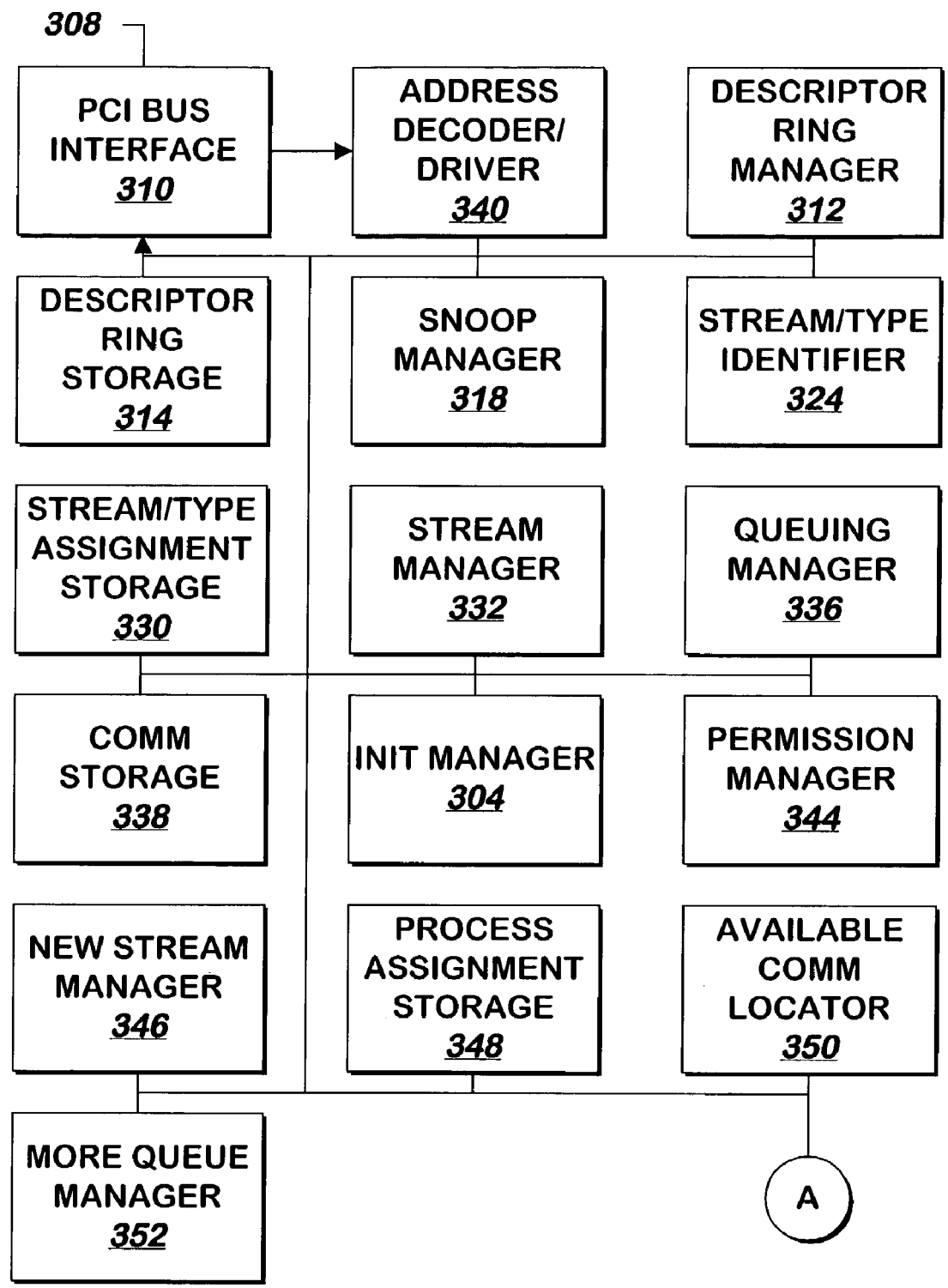
FIG. 3, consisting of FIGS. 3A and 3B, is a block schematic diagram showing master controller 214 of FIG. 2 in more detail according to one embodiment of the present invention.
Figure 3B:
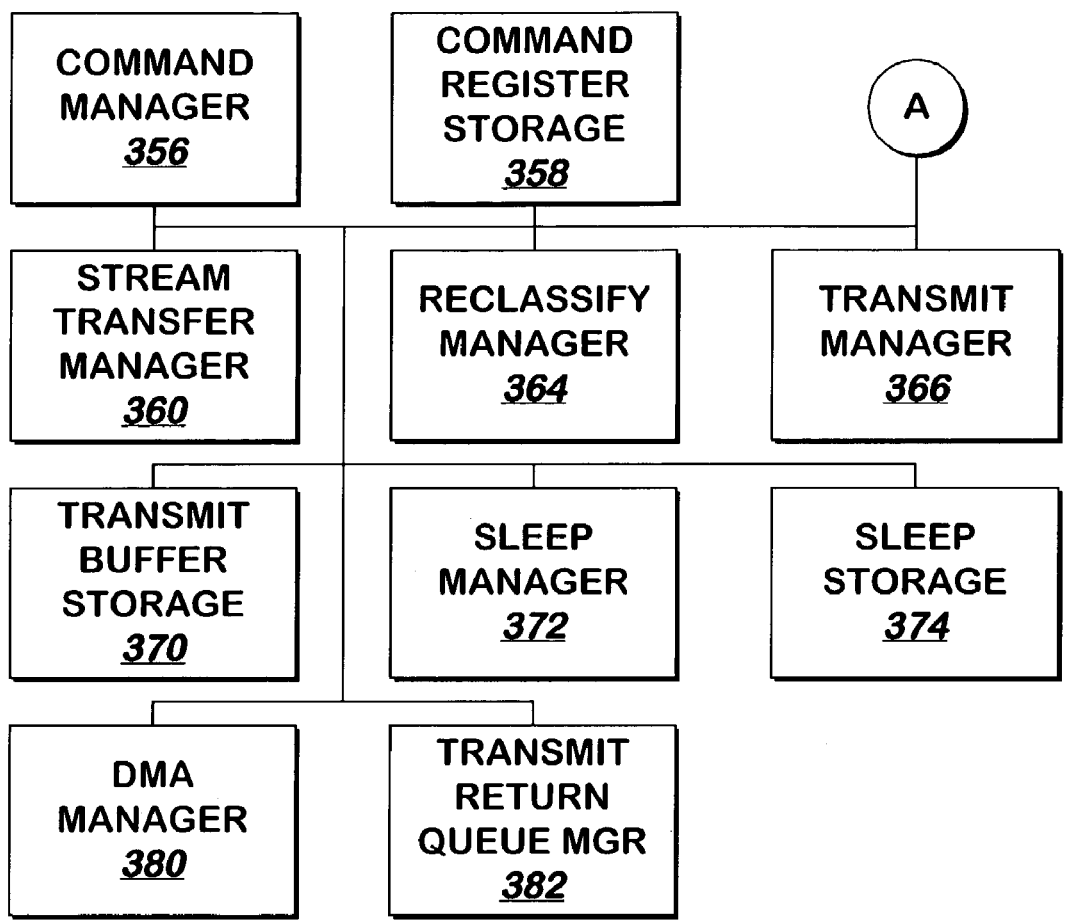
Figure 3:
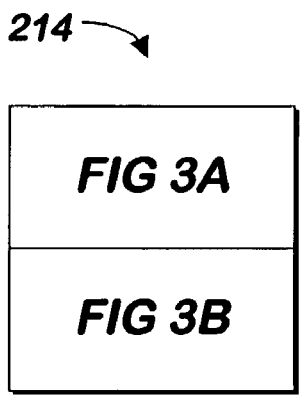

FIG. 3 consisting of FIGS. 3A and 3B, illustrates a master controller 214 of FIG. 2 in more detail according to one embodiment of the present invention. Referring now to FIGS. 2 and 3, master controller 214 stores a receive descriptor ring in descriptor ring storage 314, which may be any form of storage, such as conventional dual-port memory or disk storage. Descriptor ring storage 314 may be either read or written by communication adapter 210 and by processor system 220 essentially simultaneously. The receive descriptor ring contains a list of addresses of buffers of storage in communication memory 232 that communication adapter 210 may use to store communications received as described herein, the list having been populated by descriptor ring manager 312 at system startup. In one embodiment, descriptor ring manager 312 identifies the addresses of the buffers of storage to place in the receive descriptor ring by first requesting an area of communication memory 232 from an operating system (not shown). Descriptor ring manager 312 then divides the area into buffers, which each buffer being at least as large as the largest expected communication, and stores into descriptor ring storage 314 the addresses of each buffer as an item in the receive descriptor ring.

In one embodiment, each item in the list that makes up the receive descriptor ring not only contains an address of a buffer, but also contains an "own bit", which, when set, indicates that the associated storage buffer is available for use, or being used, by communication adapter 210, and when cleared, indicates that the buffer is available for use by processes 228A–C executing on processor system 220. Descriptor ring manager 312 sets each own bit in the receive descriptor ring as descriptor ring manager 312 constructs the receive descriptor ring in descriptor ring storage 314 to indicate that the address corresponding to the own bit is available for use by communication interface 210.

A Communication Arrives and is Stored

In one embodiment, all communication into or out of system 200 described herein is made via input/output 208 of communication adapter 210 which is coupled to a network such as the Internet, a local area network, a storage area network, a metropolitan area network or any other type of communication network. Communication adapter 210 includes a conventional communication adapter that supports Ethernet, TCP/IP, or other conventional communication protocols, and is connected to the other components of system 200 by means of a conventional bus, such as Peripheral Component Interconnect (PCI) bus 212. There may be more than one communication adapter 210 supplying communications into, and/or out of, system 200. The one or more communication adapters make up a communication resource that operates as the communication adapter described herein.

The Communication Adapter Selects an Available Storage Address

In one embodiment, communication adapter 210 may examine and/or update descriptor ring storage 314 via PCI bus 212, PCI bus interface 310, input/output 308, and address decoder/driver 340 (described below). In one embodiment, all communication in to or out of master controller 214 occurs through PCI bus interface 310 and input/output 308, which is coupled to PCI bus 212 or a conventional computer system. Communications are received by master controller 214 via PCI bus interface 310, which forwards the communications to address decoder/driver 340 (described below), except that snoop manager 318 (described below) can receive communications from PCI bus interface 310 directly. Communications out of master controller 214 pass directly through PCI bus interface 310, and need not be routed through address decoder/driver 340.

Communication adapter 210 scans the receive descriptor ring in descriptor ring storage 314, extracts the address of the buffer from a receive descriptor ring item that has the own bit set and retains the address until such time as communication adapter 210 receives a communication via input/output 208. When communication adapter 210 receives such a communication, it stores all or a portion of the communication in the buffer referred to by the extracted address, clears in the receive descriptor ring the own bit for the associated buffer, and scans the receive descriptor ring in descriptor ring storage 314 to find another buffer address having a set own bit which it can use to store the next communication.

In one embodiment, if communication adapter 210 cannot find a storage location having a set own bit, then communication adapter 210 will not store subsequent communications until such time as communication adapter 210 locates a storage location having a set own bit.

When a communication is received, communication adapter 210 stores the communication into the buffer within communication memory 232 via PCI bus 212, DMA controller 222, and the memory bus. DMA controller 222 includes a conventional Direct Memory Access controller and PCI bus controller that transfers data between the PCI bus 212 and the memory bus.

Communication memory 232 is conventional computer system memory, such as might be constructed from 64 Megabit DIMMs available from Rambus Inc. of Los Altos, Calif.

Process 228A–C may also read and write communication memory 232. Access by processes 228A–C to storage locations within communication memory 232 is under control of memory management unit 224. Memory management unit 224 is a conventional memory management unit that prevents a process 228A–C executing on processor system 220 from reading, writing, or executing a program from any portion of communication memory 232 for which process 228A–C has not been assigned access. The operating system (not shown) of processor system 220 instructs the memory management unit 224 to allow each process to access one or more portions of communication memory 232 and some portions of communication memory 232 are made accessible to more than one process 228A–C.

In one embodiment, the memory protection afforded by memory management unit 224 operates on blocks of memory of a certain size, or on integral multiples of that certain size. In one embodiment, memory management unit 224 protects storage in blocks that are integral multiples of four kilobytes. In such embodiment, queues described herein should be assigned to an address space consistent with blocks protectable by the memory management unit 224 and the protection required by the queue.

The PCI Bus is Monitored and the Communication Classified

PCI bus interface 310 receives all communications on PCI bus 212 via input/output 308 and forwards them to snoop manager 318, even communications not directed to master controller 214.

Snoop manager 318 receives and examines each address request forwarded to it by PCI bus interface 310, and when snoop manager 318 identifies that a communication is the storage of a received communication into a buffer (because it corresponds to a buffer that is within the range of such addresses that can be provided by the receive descriptor ring in descriptor ring storage 314) it captures a copy of all or a portion of such communication, captures the address of the buffer into which the communication was being stored, captures the length of the communication, and recomputes the buffer origin and length.

Snoop manager 318 recomputes the buffer origin and length in order to form a buffer header in which metadata about the buffer may be stored. To recompute the buffer origin and length, snoop manager 318 subtracts the length of the buffer header from the captured buffer address to form a new buffer address, and adds the length of the buffer header to the captured buffer length. The newly computed buffer address and buffer length are then used in place of the buffer address used by communication adapter 210 and length in subsequent manipulations. Thus, the buffer address stored within an item in descriptor ring storage 314 does not refer to the beginning of the buffer, but rather to the beginning of the data area of the buffer. In such embodiment, the data area of the buffer is preceded by a buffer header, which, in one embodiment is 330 bytes in length although other lengths may be used. Information about the buffer, herein referred to as metadata, is stored within the buffer header as described below.

Referring now to FIG. 3, snoop manager 318 sends the communication or the portion, the address of the buffer into which the communication is or was stored, and the length of such communication, to stream/type identifier 324 when snoop manager 318 determines that the storage of the communication is complete. In one embodiment, snoop manager 318 determines that the communication is complete when the own bit is cleared; snoop manager 318 is notified of this event by address decoder/driver 340 when address decoder/driver 340 receives the command to clear the own bit from communication adapter 210, as described in more detail below.

In one embodiment, the communication contains a TCP or UDP packet. In such embodiment, snoop manager 318 extracts from the communication or portion a copy of the source and destination IP addresses, source and destination ports, and protocol from the header of the TCP or UDP packet, forms these IP addresses, ports, and protocol into a five-tuple, and sends the five-tuple to stream/type identifier 324, along with the address of the buffer into which the communication was stored and the length of such communication.

A Description of the Type Assignment Table and Stream Assignment Table in Stream/Type Assignment Storage Stream/type identifier 324 receives the communication or the portion such as the five-tuple described above, the address of the buffer into which the communication was stored, and the length of the communication, and uses a stream assignment table in stream/type assignment storage 330 to identify whether the communication is part of a stream, and if not, scans a type assignment table in stream/type assignment storage 330 to identify the type of the communication as described in copending application Ser. No. 60/373,745. When the system initializes, the stream assignment table is empty, so the first communication received will not correspond to any entry in the stream assignment table. If the communication does not correspond to any entry in the stream assignment table (described in more detail below), stream/type identifier 324 attempts to identify the type of the stream using the type assignment table in stream/type assignment storage 330.

The type assignments in the type assignment table in stream/type assignment storage 330 are made by the system administrator. To create the type assignment table, the system administrator builds a configuration file using any conventional method. The type assignment table contains a number of entries, each consisting of any or all of a type criteria, a stream type identifier, and an indication of a mask, as described below.

In the embodiment where the communication contains a TCP or UDP packet, the type criteria in type assignment table in stream/type assignment storage 330 may be five-tuples containing any or all of a source IP address and port, destination IP address and port and protocol, any of which may contain wildcards, or multiple specifications, corresponding for example, to destination port 79 or 80. In such embodiment, stream/type identifier 324 scans the type assignment table in stream/type assignment storage 330 for an entry to which the five-tuple, or other portion of the communication, corresponds, for example because the five-tuple matches portions specified without wildcards of the five-tuple in the entry in the type assignment table.

As an example of how entries may correspond to a five-tuple, an entry in type assignment table in stream/type assignment storage 330 containing the communication criteria (154.16.91.4, 1536, 65.126.55.0, 80, TCP) will correspond to an identical five-tuple, while an entry in type assignment table in stream/type assignment storage 330 containing the communication criteria (*, *, *, 80, TCP) will correspond to any five-tuple containing a destination port of 80 using the TCP protocol. In this example, the five-tuples and communication criteria are ordered as source IP address, source IP port, destination IP address, destination IP port, protocol, and the asterisks (*) indicate unspecified or wildcarded portions of the communication criteria.

In one embodiment, the type assignment table in stream/type assignment storage 330 contains at least one entry, and is constructed in such a way that any possible received communication or portion matches at least one communication criterion in type assignment table in stream/type assignment storage 330. In the embodiment where a communication contains a TCP or UDP packet, a type assignment table entry at the end of the table containing the communication criterion (*, *, *, *, *) performs this function. In one embodiment, communications that correspond to a criterion consisting entirely of wildcards are assigned to a unique type, herein referred to as the default type.

As described above, in addition to the type criteria, each entry in type assignment table in stream/type assignment storage 330 also contains a stream type identifier. The stream type identifier is configured by the system administrator as described above.

If stream/type identifier 324 locates the five-tuple in the stream assignment table (as opposed to the type assignment table) as described below, stream/type identifier 324 provides the address of the buffer, the length of the communication, and the stream identifier (described below) to stream manager 332 and does not provide an indication that the stream is new.

Otherwise, if stream/type identifier 324 finds a corresponding communication criteria in the type assignment table as described above, stream/type identifier 324 selects the entry in the type assignment table in stream/type assignment storage 330 containing the corresponding type criteria. Stream/type identifier 324 extracts the stream type identifier from the selected entry and sends the stream type identifier, the address of the buffer in communication memory 232, and the length of the communication to stream manager 332 with an indication that the stream is a new stream.

The Stream Assignment Table is Updated with the Received Five-Tuple, the Stream Identifier, and the Stream Type If the indication is received that the stream is new, stream manager 332 receives the stream type, communication or portion or five-tuple, and communication address and length, selects a stream identifier, creates and stores an entry into the stream assignment table in stream/type assignment storage 330, and also stores the stream identifier and communication length in the buffer header. To select a stream identifier, stream manager 332 selects it from a queue of unused stream identifiers it internally stores.

To create a stream assignment table entry, stream manager 332 stores the five-tuple, selected stream identifier, and received stream type into an entry in the stream assignment table, and creates a stub communication entry (described in more detail below) by storing reserved values such as zeros or a negative number as a folded word portion of the entry (described below). In one embodiment, the five-tuple is masked based on the type identified, such masking performed as described in copending application Ser. No. 60/373,745.

Once stream manager 332 has created and stored a new stream assignment table entry in stream/type assignment storage 330, stream manager 332 selects the newly created stream assignment table entry.

In another embodiment, the stream identifier corresponds to an address used to store the entry for the stream in the stream assignment table and need not be separately stored with the entry in the stream assignment table.

When a subsequent communication is received, because the five-tuple from the communication will match an entry in the stream assignment table, stream/type identifier 324 need not consult the stream type table as described above.

In one embodiment, when stream manager 332 determines that the received stream type is the default type, stream manager 332 does not create or store a new stream assignment table entry but instead signals queuing manager 336 to queue the communication for a particular process 228A–C as described below. In one embodiment, one process 228A–C is identified as the handler for communications (such as communications with a default type) that are to be treated in a conventional manner (rather than by system 200), with that process reading and writing communications without the use of any of the queues or commands described herein. In one embodiment, the process that handles communications in the conventional manner is the kernel. In such embodiment, queuing manager 336 queues the communication for the kernel, which in one embodiment has a process identifier of zero.

Once stream manager 332 has performed any updates of the stream assignment table in stream/type assignment storage 330, stream manager 332 sends the address of the buffer, the length of the communication, the selected stream identifier, received stream type, and optionally an indication of the selected stream assignment table entry to queuing manager 336.

Place the Received Communication in Queue

Queuing manager 336 receives the address of the buffer into which the communication was stored (herein referred to as a communication address), the communication length, the stream identifier of the communication corresponding to the communication address, the type of the stream, and optionally the indication of the selected stream assignment table entry. Queuing manager 336 creates and stores a new entry on a communication list in communication storage 338.

A Description of the Stream Queues and of Communication Storage

Figure 4:
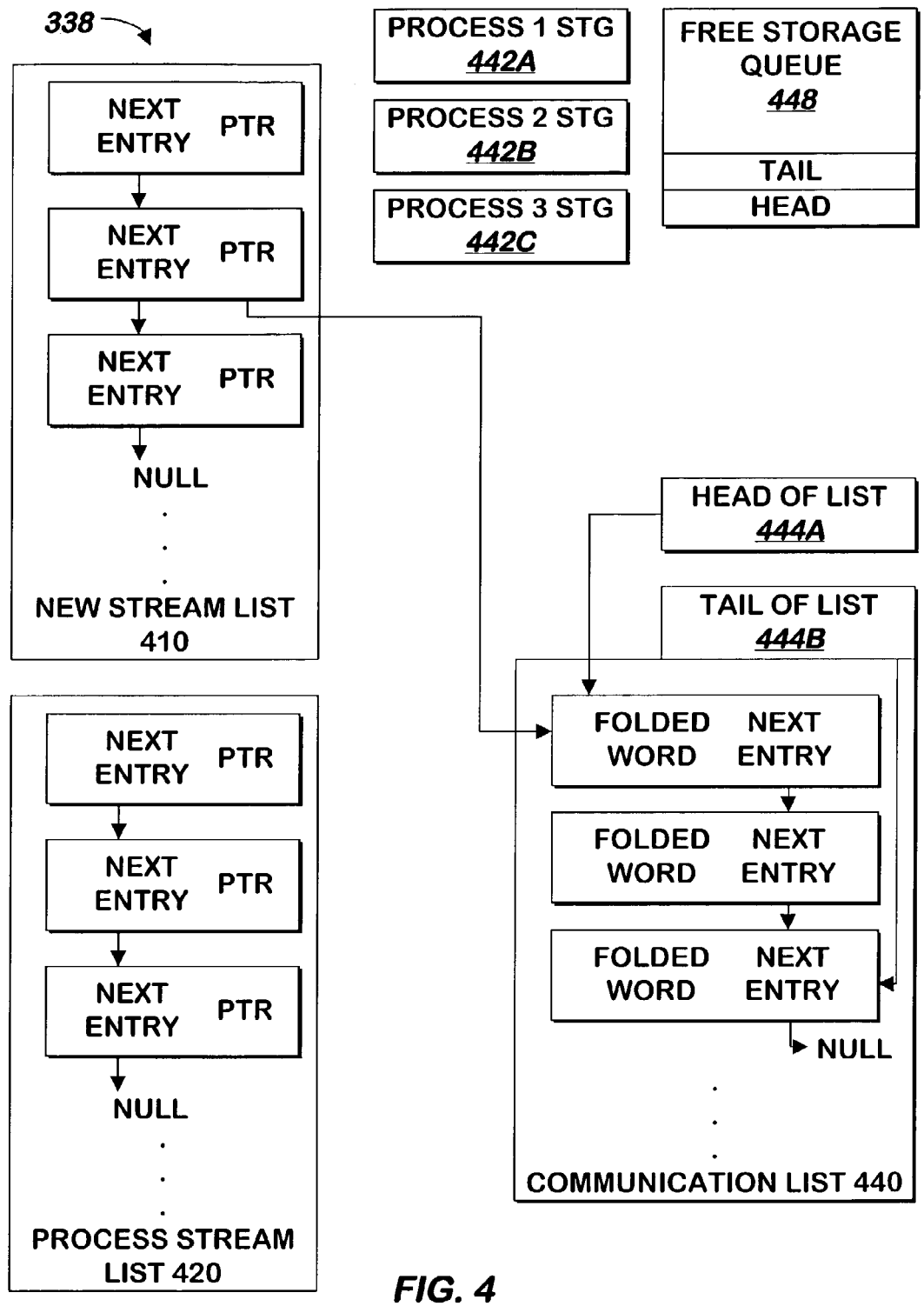
FIG. 4 is a block schematic diagram of communication storage 338 of FIG. 3A in more detail according to one embodiment of the present invention.

FIG. 4 illustrates communication storage 338 in more detail according to one embodiment of the present invention. Referring now to FIGS. 3 and 4, in one embodiment, communication storage 338 contains one or more communication lists 440. Each communication list 440 is a conventional singly- or doubly-linked list that contains a series of linked entries, all belonging to the same stream, each entry representing one communication received by system 200. Each communication list 440 has an associated head-of-list pointer 444A (head pointer), which points to the first entry of that communication list 440, or contains a null value if there are no entries in communication list 440. As referred to herein, "null" or "null value" is a pointer value that is recognized by certain elements of system 200 to be an undefined storage address. A pointer containing a null value may not validly be used to refer to a storage location. Each communication list 440 also has a tail-of-list pointer 444B (tail pointer), stored in the stream assignment table entry for that stream, which points to the last entry in the list, or contains a null value if no entries are on the list.

Each entry in a communication list 440 contains a folded word (described below) and a pointer to the next entry in that communication list 440. The "next entry" pointer of the last entry in a communication list 440 contains a null value.

Queuing manager 336 creates the folded word from the communication address and the communication length by compressing the communication address and the communication length into a single word. To compress the communication address, queuing manager 336 uses the communication address to calculate the buffer index from the communication address. In another embodiment, all buffers used to store communications in communication memory 232 are aligned on a storage boundary, such as a page boundary, and queuing manager 336 uses the storage boundary address as a buffer index. For example, if all communication buffers are aligned on page boundaries, then a communication buffer at address 5D6000 has buffer index of 5D6.

To compress the communication length, in one embodiment the largest expected communication has a length such that the length can be stored in less than a full word. In such embodiment, queuing manager 336 truncates the high-order bits of the length in such a way that the number of bits encoding the length plus the number of bits encoding the buffer index is equal to the number of bits in a word.

Queuing manager 336 forms the compressed length and the compressed communication address into a folded word, for example by placing the compressed length in the high-order portion of a word and the compressed communication address in the low-order portion of the word.

A New Communication List Entry is Created and Queued

To create and add an entry to communication list 440, queuing manager 336 extracts the value of the next entry pointer of the communication list entry referred to by the tail pointer 444B in the selected stream assignment table entry (herein referred to as the stub pointer), removes the top item from the free storage queue 448 (described below), then forms an entry from the folded word and the stub pointer (as the next entry pointer) and stores the newly formed entry at the location contained within the item removed from the free storage queue 448, while retaining a pointer to the location of the newly formed entry. Queuing manager 336 stores the location of the newly formed entry into the next entry portion of the communication list entry referred to by the tail pointer 444B from the selected stream assignment table entry, and updates the communication list 440 tail pointer 444B in the selected stream assignment table entry to refer to the newly formed communication list 440 entry.

In one embodiment, communication storage 338 contains a free storage queue 448, which is a conventional queue containing the address of every available block of storage in communication storage 338, and managed as will now be described. A conventional queue is a first-in-first-out list of items plus a head-of-queue pointer (head pointer) and an end-of-queue pointer (tail pointer). In one embodiment, each item contains a storage address. In one embodiment, the storage addresses within the items refer to blocks of unused storage within communication storage 338. To remove the first item from the free storage queue 448, queuing manager 336 retrieves the head pointer from communication storage 338, then retrieves the address of the item to be removed from the storage location referred to by the head pointer, and updates the head pointer to the next sequential storage location by adding the length of a free storage queue 448 item to the head pointer. In one embodiment, if the head pointer exceeds a threshold when updated in this manner, the process then subtracts the length of the free storage queue 448 from the head pointer (or resets the head pointer to zero).

Queuing manager 336 stores the new entries into communication list 440 by retrieving an available storage location from the free storage queue 448 as described above and storing the entry at that location.

Queuing manager 336 adds an entry to a new stream list 410 that refers to the newly created communication list 440 entry. The new stream list 410 is a conventional linked list with head and tail pointers stored in the type assignment table entry corresponding to the received stream type. Queuing manager 336 uses the received stream type to locate and select the corresponding type assignment table entry in stream/type assignment storage 330.

In one embodiment, the stream type corresponds to an address in a conventional content addressable memory which is used to store the entry for the type in the stream assignment table. In such embodiment, queuing manager 336 maintains a separate table whose entries are indexed by the address received from the content addressable memory, and it is this separate table that contains the head and tail pointers to a new stream list 410 as described above.

Queuing manager 336 maintains one new stream list 410 for each unique stream type configured in the type assignment table in stream/type assignment storage 330. Each new stream list 410 entry contains a pointer to the next new stream list 410 entry and a pointer to a communication list 440 entry associated with that stream type, although in one embodiment a new stream list 410 entry also contains the stream identifier of the referenced communication. When a type assignment table entry is added to the type assignment table by the system administrator during configuration as described above, a stub new stream list 410 entry, consisting of a null next entry pointer, a null communication list pointer, and optionally an invalid stream identifier is created and stored in communication storage 338, the head pointer portions of the newly added type assignment table entry is set to point to the stub new stream list 410 entry, and the tail pointer portion of the newly added type assignment table entry is set to a null value. As defined herein a stub entry is an entry on a queue that contains no useful data, and is linked after the last entry in that queue if the queue has at least one other entry, or else is the only entry on the queue. In one embodiment, all such stub entries are identical, so only one is created and all entries that refer to a stub, refer to that one.

To add a new stream list 410 entry, queuing manager 336 removes the first item from the free storage queue 448, and creates and stores a new stream list 410 entry in the item. To create and store a new stream list 410 entry, queuing manager 336 examines the tail pointer of the selected type assignment table entry. If the tail pointer contains a null value, then the new stream list 410 contains only a stub entry, so queuing manager 336 retains the current value of the head pointer from the selected type assignment table entry (herein referred to as the saved pointer), and updates both the head and tail pointers from the selected type assignment table entry with the location of the new stream list 410 entry. Queuing manager 336 stores the saved pointer as the next entry portion of the new stream list 410 entry.

If after examining the tail pointer of the selected type assignment table entry, queuing manager 336 determines that the tail pointer does not contain a null value, then queuing manager 336 retains the current value of the tail pointer from the selected type assignment table entry (herein referred to as the saved pointer), and updates the tail pointer from the selected type assignment table entry with the location of the new stream list 410 entry. Queuing manager 336 stores the next entry portion of the new stream list 410 entry referred to by the saved pointer in the next entry portion of the new stream list 410 entry, and stores the location of the new stream list 410 entry as the tail pointer in the selected type assignment table entry.

The received communication is now available to be provided to a process.

A Process Requests a New Stream by Reading from One of its New Stream Queues

Referring again to FIGS. 2 and 3, when a process 228A–C executing on processor system 220 is able to process a new stream, the process 228A–C requests a new communication stream having a certain type. Although only three processes 228A, 228B, and 228C are shown in the Figure, any number of processes may be present. A stream is a set of one or more communications having similar characteristics, such as having the same five-tuple as the other communications in the stream.

To request a new stream, process 228A–C reads from a new stream queue corresponding to the desired stream type. A process 228A–C may request any stream type by reading from the new stream queue associated with that stream type. Each new stream queue is part of master controller 214, and a process 228A–C reads from a new stream queue via PCI bus interface 310 by reading from an address corresponding to the type of stream desired from a set of addresses within the address space of master controller 214 that are dedicated to each process 228A–C. In one embodiment, each new stream queue operates from the point of view of each process 228A–C as if it were read-only memory: processes are allowed to read from a new stream queue but not write to it.

In one embodiment, the process 228A–C may use a translation program that translates references to network resources, to read and write the queues and commands described herein. For example, a process 228A–C may use a version of TCP/IP that reads from the new stream queue rather than requesting a communication in a conventional manner.

In one embodiment, each process 228A–C is assigned a new stream queue for each unique stream type in the type assignment table in stream/type assignment storage 330 as described above. In one embodiment there are sixteen such stream types, although any number of stream types may be used.

The Received Address of the New Stream Queue is Parsed into Process Identifier and Requested Stream Type Address decoder/driver 340 receives the request and uses the address from which process 228A–C is attempting to read to determine what the process is requesting. Address decoder/driver 340 has an address input, a read/write input, and a data input/output, which operate in the same manner as a conventional addressable memory: when the read/write input indicates a read operation, address decoder/driver 340 receives an address on its address input and provides data on its data input/output; when the read/write input indicates a write operation, address decoder/driver 340 receives an address on its address input and data on its data input/output.

To determine what the process is requesting, address decoder/driver 340 uses the received address as an index into a parsing table stored internally within address decoder/driver 340 to obtain the process identifier of the requesting process 228A–C, a request identifier, and any parameters, such as the requested stream type.

Any method of assigning addresses to processes, requesting identifiers, and parameters such as stream types may be used in the table as long as the addresses are within the address space of master controller 214 and the offset of the address from the start of the address space of master controller 214 is consistently used by both the table and the processes. As described above, new stream queues may be assigned addresses in a manner that allows memory management unit 224 to protect the reading by one process of another process' new stream queue.

Check for an Available Communication of the Requested Type and Provide Zero if not Found Address decoder/driver 340 uses the request identifier to determine that the request is for a stream of a given type, and uses the parsed stream type parameter to locate the corresponding type assignment table entry in stream/type assignment storage 330, and uses the head pointer within the located entry to locate and select the first new stream list 410 entry. If the selected new stream list 410 entry points to a stub communication list 440 entry as defined above, then address decoder/driver 340 uses the next entry portion of the selected new stream list 410 to locate and select the next new stream list 420 entry, and continues in this manner checking new stream list 410 entries for pointers to non-stub communication list 440 entries until address decoder/driver 340 finds such a non-stub communication list 440 entry or has checked all new stream list 410 entries in the new stream list 410 anchored via the head pointer in the located type assignment table entry.

If address decoder/driver 340 checks all new stream list 410 entries without finding a non-stub communication list 440 entry, then no communications of the requested type are available, so address decoder/driver 340 provides data consisting of a reserved value, such as zeros, to the requesting process 228A–C to indicate that no communications of the requested type are available for assignment to this process 228A–C. Address decoder/driver 340 provides data to a process by placing the data on its output data lines.

If address decoder/driver 340 finds a non-stub communication list 440 entry, then address decoder/driver 340 sends a pointer to the non-stub communication list 440 entry, a pointer to the new stream list 410 entry that refers to the found non-stub communication list 440 entry, the parsed process identifier, and the stream type to new stream manager 346. In one embodiment, this information is provided in two stages, to allow new stream manager 346 to check the permission of the requesting process while the non-stub communication list 440 entry is located as described above.

Receive Interrupt, Identifier, and Stream Type, and Validate the Process' Authority New stream manager 346 receives the communication list 440 entry pointer, new stream list 410 entry pointer, process identifier and stream type, checks the authority level of the requesting process 228A–C, and provides the corresponding communication to the requesting process as will now be described.

To check the authority level of the requesting process 228A–C, new stream manager 346 sends the received stream type and process identifier and an indication that the process is requesting a new stream of the indicated type to permission manager 344. Permission manager 344 receives the requested stream type and the process identifier and checks a table internal to permission manager 344 to verify that the requesting process has the authority to request the requested stream type. The table internal to permission manager 344 contains permissions indexed by process identifier, and may be generated by the kernel (described below) reading a configuration file created by the system administrator as described above, and using kernel commands (described below) to update the permissions.

Permission manager 344 uses the received process identifier to locate the permissions granted to the requesting process, and checks any parameters it receives, such as the requested stream type and the request indication, against those permissions. If the permissions indicate that the process is allowed such a request with such parameters, then permission manager 344 sends an object to new stream manager 346 indicating that permission is granted; if the permissions indicate that the process is not allowed to request such a stream type, then permission manager 344 sends an object to new stream manager 346 indicating that permission is denied.

Remove a Communication of the Requested Type from Queue

New stream manager 346 receives the object and examines it. If permission was granted, then new stream manager 346 provides the next available communication to the requesting process 228A–C, and updates the corresponding new stream list 410 to refer to the following next available communication.

Provide the Communication to the Requesting Process

New stream manager 346 extracts the folded word from the selected communication list 440 entry, and provides the folded word to the requesting process 228A–C via address decoder/driver 340.

Address decoder/driver 340 receives the folded word, and provides the folded word to the requesting process 228A–C by placing the folded word on address decoder/driver's 340 data output lines.

Update New Stream List

New stream manager 346 selects the communication list 440 entry referred to by the received communication list 440 entry pointer, selects the new stream list 410 entry referred to by the received new stream list 410 entry pointer, and retains a copy of each pointer.

New stream manager 346 updates the selected new stream list 410 entry to refer to the next communication list 440 entry in that stream. To update the selected new stream list 410 entry, new stream manager 346 copies the next entry portion of the selected communication list 440 entry to the communication list pointer portion of the selected new stream list 410 entry.

In one embodiment, new stream manager 346 maintains a buffer state table for each communication buffer. In such embodiment, new stream manager 346 locates the buffer state table entry associated with the communication address retrieved from the selected communication list 440 entry, and stores the stream identifier from the selected new stream list 410 entry and the received process identifier into the located buffer state table entry.

Update the Process Assignment Table

The process assignment table in process assignment storage 348 is used to track the assignment of stream identifiers to processes as described below. Each entry of the process assignment table in process assignment storage 348 contains a process identifier, and a head and tail pointer of a process stream list 420.

Each process stream list 420 (there is one for each process 228A–C) is a conventional linked list, stored in communication storage 338, and each process stream list 420 entry contains a link to the next process stream list 420 entry (or a null value to indicate the end of the process stream list for that process 228A–C) and a pointer to a communication list 440 entry that new stream manager 346 has provided to the associated process 228A–C, although in one embodiment a process stream list 420 entry also contains the stream identifier of the referenced communication. Process stream lists 420 are managed in a similar manner to new stream lists 410. After new stream manager 346 has caused address decoder/driver 340 to provide a communication from a new stream to a requesting process 228A–C and updated the new stream list as described above, new stream manager 346 locates the process assignment table entry corresponding to the received process identifier, and creates and stores a process stream list 420 entry in a similar manner to the way that queuing manager 336 creates and stores a new stream list 410 entry, using the head and tail pointers from the located process assignment table entry to refer to the process stream list.

The Requesting Process Receives the Folded Word, Decodes it, and Processes the Communication Referring again to FIGS. 2 and 3, after requesting a new stream by reading from its new stream queue, process 228A–C examines the word that it received from the read operation. If the read word consists of a reserved value, such as zeros, then that process 228A–C infers that there are no communications of the requested type available to be processed. In such a case, process 228A–C may read again from any of its new stream queues, examine the word received, and repeat the procedure until a non-reserved (non-zero) word is received; and in another embodiment described below, the process 228A–C may issue a command to suspend processing until such a communication is available.

When process 228A–C receives a word not containing a reserved value by reading from one of its new stream queues, process 228A–C unfolds the word by reversing the algorithm that queuing manager 336 used to fold the word, for example by splitting the folded word into a communication length and buffer index, and then using the buffer index to calculate the communication address. Process 228A–C uses the communication address and length thus reconstructed to retrieve and process the communication from communication memory 232.

A Subsequent Communication Matching an Assigned Stream Arrives

Subsequent communications may arrive that are part of a stream assigned a stream identifier as described above. Communication adapter 210 scans the receive descriptor ring in descriptor ring storage 314 to find another storage location into which it can store the next communication as described above, then receives and stores the communication as described above. Snoop manager 318 copies all or a portion of this communication, the address of the buffer into which the communication was stored, and the length of the communication and sends the communication or the portion, the address and the length to stream/type identifier 324 as described above.

The Corresponding Stream is Identified

Stream/type identifier 324 receives the communication or the portions such as the five-tuple, and the address and length of the communication and scans the stream assignment table in stream/type assignment storage 330 for an entry containing a five-tuple or other criteria corresponding to the communication, portion or five-tuple, as described above. Because the portion such as the five-tuple has been assigned to a stream and entered into the stream assignment table as a stream as described above, stream/type identifier 324 will locate in the stream table in stream/type assignment storage 330 an entry corresponding to that portion. When stream/type identifier 324 finds a correspondence with an entry as described above, stream/type identifier 324 sends the stream identifier from the found stream assignment table entry, the address and length of the communication, and an indication of the stream assignment table entry that it found to queuing manager 336.

A Communication List Entry is Constructed and Queued

Referring now to FIGS. 3 and 4, queuing manager 336 receives the stream identifier, the communication address, the communication length, and the indication of the stream assignment table entry, creates a new communication list 440 entry as described above, and adds the newly created entry to communication list 440 for the type corresponding to the stream assignment table entry as described above.

Queuing manager 336 uses the tail pointer 444B from the indicated stream assignment table entry to add the newly created communication list entry to the end of the communication list 440 for that stream as described above.

A Process Requests a Communication for a Stream Already Assigned to it

Referring again to FIGS. 2, 3, and 4, when a process 228A–C executing on processor system 220 wishes to process a communication from a stream already assigned to it, the process 228A–C requests a new communication by reading from its more queue. A stream is assigned to a process if the process has read a communication from the stream as described above. Each process has a more queue assigned to it. A process 228A–C requests a communication from its more queue in a manner similar to that used to request communications from a new stream queue: each more queue is part of master controller 214, and a process 228A–C reads from a more queue via PCI bus interface 310 by reading from an address within the address space of master controller 214 that is dedicated to each process 228A–C. In one embodiment, each more queue operates from the point of view of each process 228A–C as if it were read-only memory: processes are allowed to read from a more queue but writing to it achieves no effect.

Address decoder/driver 340 receives and parses the address from which process 228A–C is attempting to read in a manner similar to the way that address decoder/driver 340 parses the address of a new stream queue as described above to obtain the process identifier of the requesting process and determine that the process 228A–C is requesting a communication from its more queue. Address decoder/driver 340 uses the received process identifier to find the head pointer in the list of streams assigned to the process 228A–C in the process assignment table in process assignment storage 348, and uses the head pointer to locate and select the first process stream list 420 entry. If the selected process stream list 420 entry points to a stub communication list 440 entry as defined above, then address decoder/driver 340 uses the next entry portion of the selected process stream list 420 entry to locate and select the next process stream list 420 entry, and continues in this manner checking process stream list 420 entries for pointers to non-stub communication list 440 entries until address decoder/driver 340 finds such a non-stub communication list 440 entry or has checked all process stream list 420 entries in the process stream list 420 corresponding to the streams assigned to the requesting process 228A–C.

If address decoder/driver 340 checks all process stream list 420 entries corresponding to the streams assigned to the requesting process 228A–C without finding a non-stub communication list 440 entry, then address decoder/driver 340 provides a reserved value, such as zeros, to the requesting process 228A–C as described above to indicate that there are no communications assigned to that process' 228A–C more queue.

If address decoder/driver 340 finds a non-stub communication list 440 entry, then address decoder/driver 340 sends a pointer to the non-stub communication list 440 entry, a pointer to the process stream list 420 entry that refers to the found non-stub communication list 440 pointer, and the parsed process identifier to more queue manager 352.

Provide a Communication from the Process Stream List, if Available

More queue manager 352 receives the communication list 440 pointer, the process stream list 420 entry pointer, and the process identifier, and provides the indicated communication to the requesting process 228A–C as will now be described.

More queue manager 352 extracts the folded word from the selected communication list 440 entry and provides the folded word to the requesting process 228A–C via address decoder/driver 340 as described above. More queue manager 352 selects the communication list 440 entry referred to by the received communication list 440 entry pointer, selects the process stream list 420 entry referred to by the received process stream list 420 entry pointer, and finds the process assignment table entry in process assignment storage 348 associated with the received process identifier.

More queue manager 352 updates the process stream list 420 anchored in the found process assignment table entry to refer to the next communication in this stream by copying the next entry portion of the selected communication list 440 entry to the communication list pointer portion of the selected process stream list 420 entry.

In one embodiment, more queue manager 352 stores the stream identifier into the buffer state table entry corresponding to the selected communication list 440 entry in a similar manner to the way that new stream manager 346 updates the buffer state table.

A Process Releases a Buffer

Referring again now to FIGS. 2 and 3, after processing a requested communication, process 228A–C may wish to release the buffer in communication memory 232 containing that communication so that it may be reused. To release a buffer, process 228A–C checks its command register counter, and then optionally writes a command to its command register as will now be described.

A Description of the Command Registers and Command Register Counters

Each process 228A–C has a command register counter in process storage 442A–C (described below). Before writing to its command register, the process 228A–C compares the previous value of the command register counter (which the process 228A–C saves in storage internal to itself) to the current value of the command register counter. If the two values are the same, then the process 228A–C may repeatedly compare the previous value of the command register counter to the current value of the command register counter after waiting for a period of time, and does not write to the command register unless the two values differ. After the process 228A–C writes to its command register, the process 228A–C copies the current value of the command register counter to use as the previous value of the command register counter the next time the process 228A–C intends to use its command register.

A Description of Process Storage

In one embodiment, each process 228A–C has its own process storage 442A–C in communication storage 338 to allow status variables to be retrieved by processes 228A–C at memory speeds. The several process storage 442A–C are arranged in communication storage 338 in such a way that the process storage 442A–C associated with a particular process 228A–C can be located by using the process identifier of that process 228A–C. In one embodiment, process storage 442A–C are arranged so that a process storage 442A–C location can be computed by using its associated process identifier as an offset from an initial memory location at which process storage is stored. In another embodiment, initialization manager 304 sets up a table of process storage 442A–C locations, indexed by process identifier.

A Process Writes to its Command Register

As described below, there is one command register for each process 228A–C, and a process 228A–C references its command register via the PCI bus interface 310 by writing, via a conventional memory write command, to an address within the address space of master controller 214 that is dedicated to the command register for that process 228A–C.

PCI bus interface 310 receives the command and provides the command to address decoder/driver 340. In one embodiment, each command register operates from the point of view of each process 228A–C as if it were write-only memory: processes are allowed to write to it but attempting to read from it produces no effect.

During initialization, each process 228A–C is assigned address space for one block of storage to which commands may be written, herein referred to as a command register, and each process 228A–C writes to the command register assigned to it. In one embodiment, the address space which includes the address of the command register is protected by MMU 224 as described above, so that writing to a command register by a process 228A–C is allowed only for the process 228A–C to which that address space has been assigned. Address decoder/driver 340 receives the command (and any parameters as described below) and the address and decodes the address to identify 1) the fact that what was written was a command written to a command register, and 2) the identity of the process that wrote the command, stores the command and an identifier of the process into a FIFO in command register storage 358, and if the FIFO was empty when the command was stored into it, address decoder/driver 340 signals command manager 356, for example by presenting an interrupt to command manager 356.

Address decoder/driver 340 associates a particular process 228A–C with the address of that process' 228A–C command register by means of that process' 228A–C process identifier. In one embodiment, the command register addresses are assigned sequentially by process identifier so that the location of the command register can be computed from the process identifier. In another embodiment, the process identifier is stored by command manager 356 in an entry in a table along with the address of the corresponding command register.

In one embodiment, each command written to a command register by processes 228A–C contains a command code and zero or more parameters contained in the data word written. In such embodiment, to release a communication buffer, a process 228A–C writes a command consisting of a command code to release a communication buffer with a parameter of the buffer index, to that process' 228A–C command register, and this command is provided to the FIFO in command register storage 358 as described above. In one embodiment, a command code of zero indicates that no command has been made.

Receive and Parse the Command

Referring again to FIGS. 2, 3, and 4, when command manager 356 receives the signal, or completes processing a command, command manager determines whether any commands are awaiting service in the FIFO in command register storage 358. When command manager 356 finds such a command in command register storage 358, command manager 356 retrieves the process identifier of the process 228A–C from which the command was received as described above, updates the associated command register counter in process storage 442A–C, extracts the command code from the command, uses the command code as an index into a table stored internally within command manager 356 to identify the component of system 200 that handles the extracted command code, and signals that component with the parameter from the found command register.

To update the command register counter in process storage 442A–C associated with the process 228A–C that wrote the command as described above, command manager 356 extracts from process storage 422A–C corresponding to the process for which the command register counter is being updated the current value of the associated command register counter via PCI bus 212 and DMA controller 222, increments the extracted value, and replaces the associated command register counter with the incremented value, again via PCI bus 212 and DMA controller 222. In one embodiment, address decoder/driver 340 updates the command register counter when the command is received, instead of command manager 356 as described above.

When command manager 356 retrieves the command to release a buffer in a FIFO in command register storage 358, command manager 356 sends the command parameter, which in this case is the index of the buffer to be released, to queuing manager 336 with an indication that the buffer is to be released. Queuing manager 336 receives the buffer index, locates the corresponding communication list 440 entry, and frees all storage associated with that entry.

Locate the Communication to be Released

To locate the communication to be released, queuing manager 336 transforms the received buffer index into a buffer address using the reverse of the algorithm that queuing manager 336 used to transform the buffer address into a buffer index as described above, and sends the buffer address to available communication locator 350.

Identify the Stream Identifier, then Scan the Associated Communication List

Available communication locator 350 receives the buffer address, reads the buffer header via DMA controller 222 and PCI bus 212 to identify the stream identifier stored in the buffer header, scans the stream assignment table in stream/type assignment storage 330 to locate the entry corresponding to the identified stream identifier, and uses the head pointer 444A in the located entry to scan the communication list 440 associated with that stream.

In another embodiment, available communication locator 350 scans the buffer state table to locate the entry corresponding to the received buffer address, extracts the stream identifier from the located buffer state table entry, scans the stream assignment table in stream/type assignment storage 330 to locate the entry corresponding to the extracted stream identifier, and uses the head pointer 444A in the located entry to scan the communication list 440 associated with that stream.

To scan a communication list 440, available communication locator 350 selects the entry referred to by the head pointer 444A in the located stream assignment table entry, and retains a pointer to the location of that head pointer 444A, herein referred to as the previous pointer. Available communication locator 350 compares the portion of the folded word containing the buffer index from the selected communication list 440 entry to the received buffer index.

If the received buffer index is not contained within the folded word from the selected communication list 440 entry, then available communication locator 350 extracts the next entry pointer from the selected communication list 440 entry, retains the address of the next entry pointer of the selected communication list 440 entry as the previous pointer, selects the communication list 440 entry referred to by the next entry pointer, and continues comparing the received buffer index to the folded word from each communication list 440 entry in turn in this manner until available communication locator 350 either finds an entry in the communication list 440 containing a folded word that includes the buffer index, or encounters a null value as the next entry of the selected communication list 440 entry indicating no further communications in that stream exist.

Before selecting a communication list 440 entry referred to by a pointer, available communication locator 350 examines the pointer to see if it contains a null value. If so, then available communication locator 350 has reached the end of communication list 440 without finding a match; this indicates that no such communication list 440 entry has been found.

If available communication locator 350 finds such an entry, available communication locator 350 returns the location of the selected communication list 440 entry and the previous pointer to queuing manager 336.

Queuing manager 336 receives the location of the selected communication list 440 entry and the previous pointer, ensures that the process 228A–C associated with the receives process identifier is authorized to release the located buffer, removes the selected communication list 440 entry from communication list 440 and places the removed communication list 440 entry onto the free storage queue 448. To ensure that the located buffer may be released by the indicated process 228A–C, queuing manager 336 scans the buffer state table in communication storage 338 to locate the entry associated with the received communication list 440 entry, and compares the process identifier from the located buffer state table entry with the received process identifier. If the two process identifiers do not match, then queuing manager 336 indicates an error by sending an interrupt to the requesting process 228A–C as described below.

If the two process identifiers match, queuing manager 336 removes the selected communication list 440 entry from communication list 440 by replacing the next entry portion of the communication list 440 entry referred to by the previous pointer with the value of the next entry pointer of the selected communication list 440 entry while retaining a pointer to the selected communication list 440 entry. Queuing manager 336 uses the stream identifier from the located buffer state table entry to find the corresponding head and tail pointers, and updates either the head or tail pointer if either refer to the selected communication list 440 entry. To update the head pointer, queuing manager 336 stores the next entry value from the selected communication list 440 entry into the head pointer; to update the tail pointer, queuing manager 336 scans the communication list 440 until it locates the entry that refers to the selected communication list 440 entry, then updates the tail pointer to refer to the located entry.

Queuing manager 336 places the address of the selected communication list 440 entry (which is no longer part of communication list 440) on to free storage queue 448. To place a storage block on the free storage queue 448, a process stores a pointer to the storage block at the location referred to by the free storage queue 448 tail pointer, then updates the tail pointer to the next sequential storage location by adding the length of a queue item to the tail pointer. In one embodiment, if the tail pointer exceeds a threshold when updated in this manner, the process subtracts the length of the queue from the tail pointer (or sets the tail pointer to zero) after storing the address of the item as described above. Queuing manager 336 then converts the folded word into a communication address in a similar manner to the way that a process 228A–C performs the same operation as described above, adds the buffer header length to the converted buffer address to compute the buffer data address, and sends the buffer data address to descriptor ring manager 312.

Descriptor ring manager 312 receives the buffer data address and scans the receive descriptor ring in descriptor ring storage 314 looking for an item that contains the received buffer data address. When descriptor ring manager 312 finds such an item, descriptor ring manager 336 sets the own bit in the item to identify the associated buffer in communication memory 232 as available for use by communication adapter 210.

A Process Re-Queues its Stream to Another Process

A process 228A–C may wish to re-queue the stream corresponding to any of the communications that that process 228A–C has not yet released, to another process.

To re-queue a stream, a process 228A–C writes a re-queue stream command to its command register as described above. In one embodiment, the re-queue stream command has parameters consisting of the buffer index of a communication received by the requesting process 228A–C, and the stream type of the new stream list 410 to which the communications should be re-queued.

Command manager 356 retrieves the command from command register storage 358 as described above, identifies the command register and the re-queue stream command, and sends the process identifier of the requesting process 228A–C, the buffer index, and the requested stream type to stream transfer manager 360.

Stream transfer manager 360 receives the requesting process' process identifier, the buffer index, and the requested stream type, checks the authority of the requesting process to perform such a transfer, and if the process has such authority, stream transfer manager 360 transfers the stream.

To check the authority of the requesting process, stream transfer manager 360 forwards the process identifier and the stream type to permission manager 344, which receives the process identifier and stream type and checks a table internal to permission manager 344 as described above. If the table indicates that the requesting process may transfer streams to that type and that the requesting process has permission to make transfers, then permission manager 344 returns an object indicating that permission was granted to stream transfer manager 360 as described above; otherwise permission manager 344 returns an object indicating that permission was denied.

Identify the Stream Identifier of the Stream to be Transferred

Stream transfer manager 360 receives the object and examines it. If the object indicates that permission is granted, then stream transfer manager 360 identifies the stream identifier of the stream being transferred.

To identify the stream identifier of the stream to be transferred, stream transfer manager 360 converts the buffer index into a buffer address as described above, and in one embodiment reads the stream identifier from the buffer header as described above, and in another embodiment scans the buffer state table as described above.

Transfer Communication Buffers Belonging to the Identified Stream to the New Stream Queue Stream transfer manager 360 alters the process stream list 420 associated with the requesting process 228A–C and the new stream list 410 associated with the received stream type to move pointers to communications buffers associated with the identified stream from the requesting process' 228A–C process stream list 420 to the new stream list 410 associated with the received stream type.

In one embodiment, when a process stream list 420 entry is constructed and stored in communication storage 338, the stream identifier associated with the communication to which the process stream list 420 entry refers is stored within that process stream list 420 entry. Similarly, when a new stream list 410 entry is constructed and stored in communication storage 338, the stream identifier associated with the communication to which the new stream list 410 entry refers is stored within that new stream list 410 entry. In such embodiment, stream transfer manager 360 moves communications from a process stream list 420 to a new stream list 410 by scanning the process stream list 420 to locate the process stream list 420 entry associated with the identified stream identifier, removing the located process stream list 420 entry from that process stream list 420, and adding the removed process stream list 420 entry to the corresponding new stream list 410, as a new stream list 420 entry.

The Process Stream List Entry is Located and Removed

To locate and remove a process stream list-420 entry, stream transfer manager 360 selects the process stream list 420 entry referred to by the head pointer within the process assignment table entry associated with the received process identifier, and retains a pointer to the location of the head pointer, herein referred to as the previous pointer. Stream transfer manager 360 compares the stream identifier in the selected process stream list 420 entry to the identified stream identifier.

If the two stream identifiers do not match, then stream transfer manager 360 updates the previous pointer to point to the selected process stream list 420 entry, selects the process stream list 420 entry referred to by the next entry pointer of the selected process stream list 420 entry, compares its stream identifier to the identified stream identifier, and continues in this manner until stream transfer manager 360 has located a process stream list 420 entry containing the identified stream identifier.

Stream transfer manager 360 removes the selected process stream list 420 entry from its process stream list 420 by replacing the next entry pointer of the process stream list 420 entry referred to by the previous pointer with the value of the next entry pointer from the selected process stream list 420 entry.

The Removed Process Stream List Entry is Added to the New Stream List, and Pointed Back to the First Communication for that Stream Stream transfer manager 360 adds the removed process stream list 420 entry to the new stream list 410 associated with the requested stream type as described above, and updates the communication list 440 pointer of the newly added new stream list 410 entry to refer to the first communication for the identified stream.

To update the communication list 440 pointer for the newly added new stream list 410 entry, stream transfer manager 360 locates the stream assignment table entry associated with the identified stream identifier, and copies the head pointer 444A from the located stream assignment table entry into the communication list 440 pointer portion of the newly added new stream list 410 entry.

A Process Returns a Communication to be Reclassified

In one embodiment, a process 228A–C may alter a received communication, for example by changing all or a portion of the five-tuple. In such embodiment, the process 228A–C may wish to reclassify the altered communication as a different type so that the altered communication may be assigned to a different process 228A–C when that different process requests a new stream of that type as described above. To re-classify a communication, a process 228A–C writes a reclassify command to its command register, specifying the buffer index of the communication to reclassify.

Command manager 356 retrieves the command from command register storage 358 as described above, identifies the command register and the reclassify buffer command, and sends the process identifier of the requesting process 228A–C and the buffer index to reclassify manager 364.

Reclassify manager 364 receives the process identifier and the buffer index, and sends the process identifier to permission manager 344 with an indication that the process is attempting to reclassify a communication. Permission manager 344 returns an object indicating whether or not the process 228A–C is authorized to reclassify communications by consulting the table it internally stores as described above. Reclassify manager 364 scans the buffer state table in communication storage 338 to compare the received process identifier to the process identifier associated with the received buffer index as described above, and treats the command as unauthorized if the two process identifiers do not match.

If authorized, reclassify manager 364 identifies the stream identifier of the buffer referred to by the buffer index as described above, and scans the associated communication list 440 as described above to locate and select the communication list 440 entry containing a folded word containing the received buffer index.

Remove the Corresponding Communication List Entry from Queue and Send the Communication to be Snooped Reclassify manager 364 sends the address of the selected communication list 440 entry to queuing manager 336, which removes the selected communication list 440 entry from communication list 440 as described above.

Reclassify manager 364 extracts the folded word from the selected entry (it is no longer a communication list 440 entry), unfolds the folded word into a communication address and length as described above, reads the communication from communication memory 232 via PCI bus interface 310, input/output 308, and DMA controller 222, and sends the communication, communication address, and communication length to snoop manager 318. In one embodiment, reclassify manager 364 maintains a reclassify queue containing communications to be reclassified, anchored within reclassify manager 364. In such embodiment, reclassify manager 364 places an item containing the communication, communication address, and communication length on the end of the reclassify queue. Snoop manager 318 removes and processes the top item from the reclassify queue as described below.

Snoop manager 318 receives the communication, address, and length, extracts a portion or a five-tuple from the communication, and sends the communication, the portion, or the five-tuple to stream/type identifier 324 along with the communication address and the communication length to be identified as part of a stream, or to be typed and otherwise processed as described above.

Because a new entry for the communication will be built as described above, reclassify manager 364 places the selected, former communication list 440 entry on free storage queue 448 as described above.

A Process Closes a Stream

A process 228A–C may decide that it no longer wishes to process communications from a particular stream. In this case, the process 228A–C writes a close stream command to its command register, with a parameter of the buffer index of a communication belonging to the stream to be closed.

Command manager 356 retrieves the command from command register storage 358 as described above, identifies the command register and the close stream command, and sends the process identifier of the requesting process 228A–C and the buffer index to stream manager 332 with an indication to close the stream associated with the buffer.

Stream manager 332 receives the process identifier and the buffer index, and sends the process identifier to permission manager 344, which returns an object indicating whether or not the process 228A–C is authorized to close the stream as described above. Stream manager 332 checks the buffer state table as described above to determine if the received process identifier matches the process identifier from the buffer state table entry corresponding to the received buffer index. If authorized and the process identifiers match, stream manager 332 identifies the stream identifier corresponding to the received buffer index as described above, and scans the stream assignment table in stream/type assignment storage 330 to locate the head pointer 444A of the corresponding communication list 440.

Delete Communication List Entries and Make the Buffer Available

Stream manager 332 deletes all communication list 440 entries associated with the indicated stream by selecting the first entry from the corresponding communication list 440, extracting the folded word from the selected communication list 440 entry and converting the folded word into a buffer index as described above. Stream manager 332 then sets the own bit in the receive descriptor ring in descriptor ring storage 314 for the buffer corresponding to the buffer index.

Stream manager 332 retains a copy of the next entry pointer from the selected communication list 440 entry, and deletes the selected communication list 440 entry as described above.

Stream manager 332 uses the retained next entry pointer to locate and select and delete the next communication list 440 entry, and continues in this manner until stream manager 332 has deleted all communication list 440 entries associated with the identified stream identifier.

Stream manager 332 locates the process stream list 420 corresponding to the received process identifier, and scans the located process stream list 420 to find and delete the process stream list 420 entry containing the identified stream identifier as described above. Stream manager 332 then adds the stream identifier of the stream to the queue of unused stream numbers it maintains.

A Process Requests an Empty Transmit Buffer

Referring again to FIGS. 2 and 3, when a process 228A–C wishes to transmit a communication, for example, in response to a received communication, the process 228A–C requests an empty transmit buffer by reading from one of its empty transmit buffer queues. Each process has one or more empty transmit buffer "queues" assigned to it. An "empty transmit buffer queue" is not technically a queue, but is used by a process 228A–C to request the address of a transmit buffer. A process requests a buffer of a particular type by reading from an empty transmit buffer queue of that type. Each empty transmit buffer queue is part of master controller 214, and a process 228A–C reads from an empty transmit buffer queue via PCI bus interface 310 by reading from an address within the address space of master controller 214 dedicated to each process 228A–C. There is one address per transmit buffer queue for each process 228A–C. In one embodiment, each empty transmit buffer queue operates from the point of view of each process 228A–C as if it were read-only memory: processes are allowed to read from an empty transmit buffer queue, but writing to it achieves no effect.

Address decoder/driver 340 receives and parses the address from which process 228A–C is attempting to read in a similar manner to the way that address decoder/driver 340 parses the address of a new stream queue or a more queue as described above to obtain the process identifier of the requesting process and the transmit buffer type the process is requesting by reading from the queue.

As described in more detail below, address decoder/driver 340 checks for the availability of the requested transmit buffer type, provides a reserved value such as zeros to the requesting process 228A–C if the requested transmit buffer type is not available, and otherwise forwards the request to transmit manager 366, as described in more detail below.

The Transmit Buffers and the Transmit Descriptor Ring

Transmit manager 366 maintains a number of transmit buffers in communication memory 232, one for each type available to be requested by process 228A–C. The address of a transmit buffer is provided to a process that reads from its empty transmit buffer queue of the same type if the process is authorized and a queue of that type is available. In one embodiment, transmit buffer types correspond to type of communications to be transmitted. For example, one transmit buffer type may be used for HTTP communications, another for FTP communications and another for ICMP communications.

In one embodiment, transmit manager 366 maintains fifteen transmit buffers, although other embodiments support other numbers of transmit buffers. Each of the transmit buffers occupies a different block of communication memory 232 that is independently protectible by MMU 224. The operating system kernel 228D and kernel commands are described in more detail below, but briefly, during system 200 initialization the kernel uses one or more kernel commands to designate the blocks of storage within communication memory 232 to be used as transmit buffers, signals MMU 224 to mark particular blocks as accessible to those processes 228A–C that should have access to each such transmit buffer, and signal permission manager 344 to update its internal table of which processes 228A–C are authorized to access which transmit buffer types. The use of an MMU protection scheme protects each transmit buffer of a particular type from errant processes that are not authorized to access a transmit buffer of that particular type.

The kernel 228D grants, via MMU 224 and permission manager 344, each process 228A–C permission to access one or more transmit buffers corresponding to the types of communications they are expected to process.

For example, one transmit buffer might be assigned to HTTP traffic, and so any processes 228A–C that are to process HTTP communications would be authorized to write to that transmit buffer, and processes 228A–C that are not to process HTTP communications would not be authorized to write to that transmit buffer.

Upon system startup, initialization manager 304 also constructs a transmit descriptor ring in descriptor ring storage 314, similar to the receive descriptor ring described above. The transmit descriptor ring's items each contain the address of one of the blocks of storage in communication memory 232 that the kernel has designated as a transmit buffer, such that each such designated block of communication memory 232 is described using one transmit descriptor ring item. The transmit descriptor ring items also each contain a length field (described below) and an own bit as described above. Initialization manager 304 clears the own bit in each item in the transmit descriptor ring in descriptor ring storage 314 to indicate that each transmit descriptor ring item may be written to by a process 228A–C, rather than by communication adapter 210.

Check for an Available Transmit Buffer of the Requested Type

When a process reads from one of its empty transmit buffer queues, address decoder/driver 340 checks the availability of the transmit buffer of the parsed type, and if available, sends the received process identifier and transmit buffer type to transmit manager 366.

To check the availability of a transmit buffer of a particular type, address decoder/driver 340 checks a transmit buffer table stored in transmit buffer storage 370 that contains, in an entry for each transmit buffer, the transmit buffer address, the transmit buffer type, a "sent" flag, and the process identifier of the process that is currently using that transmit buffer, or an indication that the transmit buffer is not in use. As described below, address decoder/driver 340 causes the sent flag to be sent when it detects that the contents of the corresponding transmit buffer have been sent, which occurs when the corresponding own bit in the transmit descriptor ring is cleared by communication adapter 210 following transmission of the communication in the buffer.

If the transmit buffer table indicates that the transmit buffer of the requested type is in use by a different process 228A–C, then address decoder/driver 340 provides a reserved value, such as zeros, to the requesting process 228A–C to indicate that the requested transmit buffer is not available.

If the transmit buffer table entry indicates that the transmit buffer of the requested type is not in use, then transmit manager 366 sends the received process identifier and transmit buffer type to transmit manager 366.

Check Permission and Assign Available Transmit Buffer to the Requesting Process

Transmit manager 366 receives the process identifier and transmit buffer type, and checks the permission of the requesting process 228A–C to request a transmit buffer of that type.

To check the permission of the requesting process 228A–C, transmit manager 366 sends the process identifier and transmit buffer type to permission manager 344 with an indication that the transmit buffer of that type has been requested by the process 228A–C, which checks the table of permissions that permission manager 344 maintains and returns an object indicating whether or not the process 228A–C is authorized to receive a transmit buffer of the requested type as described above. Transmit manager 366 receives the permission object and provides an error indication to the requesting process 228A–C if the requesting process 228A–C is not authorized, as described above.

If the requesting process 228A–C is authorized, transmit manager 366 uses the requested transmit buffer type to locate the corresponding transmit buffer address in the transmit buffer table in transmit buffer storage 370. Transmit manager 366 stores the process identifier of the requesting process 228A–C in the located transmit buffer table entry, and clears the sent flag in the located entry to indicate that the transmit buffer of the requested type is now in use. Transmit manager 366 provides a buffer index corresponding to the address of the transmit buffer, and the length of the transmit buffer in a folded word as described above to address decoder/driver 340, which provides the folded word to the requesting process 228A–C as described above.

The requesting process 228A–C completes the read operation by receiving the buffer index and the buffer length, converts the buffer index into a transmit buffer address as described above, and is then free to write to the transmit buffer as desired.

The Process Fills the Buffer and Requests that it be Transmitted

Once the requesting process 228A–C has received the folded word corresponding to, and written to, a transmit buffer, the process 228A–C may wish to have the buffer transmitted. To request that a buffer be transmitted, a process 228A–C writes a "transmit buffer" command to its command register, which is received, the address decoded to determine the process, and the process identifier and command are placed onto the FIFO in command register storage 358 by address decoder/driver 340. In one embodiment, the command includes parameters of the transmit buffer index and the length of the communication to transmit (which may be less than the length of the transmit buffer) in the format of a folded word as described above.

Command manager 356 retrieves the command from the FIFO in command register storage 358 as described above, identifies the transmit buffer command, and sends the process identifier of the requesting process 228A–C, the buffer index, and the communication length to transmit manager 366.

Update the Own Bit in the Transmit Descriptor Ring Item Associated with the Buffer to be Transmitted Transmit manager 366 receives the requesting process 228A–C identifier, buffer index, and communication length, and converts the buffer index into a buffer address as described above. Transmit manager 366 uses the buffer index to locate the item containing the converted buffer address in descriptor ring storage 314, and once located, stores the communication length into the located item and sets the own bit in the located item to signal that the buffer is ready to be transmitted.

The Communication Adapter Reads from the Descriptor Ring

Communication adapter 210 continuously monitors the items of the transmit descriptor ring in descriptor ring storage 314, or is notified to monitor the ring by transmit manager 366 when transmit manager 366 alters the own bit in the transmit descriptor ring in descriptor ring storage 314 as described herein. To read an address from descriptor ring storage 314, communication adapter 210 performs a conventional memory read command on PCI bus 212 to the descriptor ring storage 314 address. Address decoder/driver 340 receives the read command, identifies that it is within the address space of the transmit descriptor ring and provides the requested data from the transmit descriptor ring by placing on its data output the unmodified contents of the transmit descriptor ring corresponding to the address.

The Communication Adapter Reads the Buffer, Transmits it, and Updates the Own Bit in the Descriptor Ring When communication adapter 210 locates an item with a set own bit as it scans the transmit descriptor ring items in descriptor ring storage 314, communication adapter 210 reads the number of bytes indicated by the length field of the located item from the address stored in the located item via PCI bus 212 and DMA controller 222, and transmits the read data via input/output 208 using conventional techniques.

Once communication adapter 210 has completed sending the communication, communication adapter 210 clears the own bit in the located transmit descriptor ring item in descriptor ring storage 314 by writing to the address of the item. Address decoder/driver 340 intercepts the write command, clears the own bit in the item in descriptor ring storage 314, and provides the address of the corresponding transmit descriptor ring item to transmit manager 366.

Transmit manager 366 receives the address of the transmit descriptor ring item, extracts the corresponding transmit buffer address, locates the corresponding transmit buffer table entry, and sets the sent flag in the located entry.

The Process Requests that a Transmit Buffer be Transmitted and Released

In one embodiment, a process 228A–C may request that after the contents of a buffer are transmitted as described above, that the buffer be released so that it may be reused by other processes 228A–C.

In such embodiment, the process 228A–C writes a transmit and release buffer command to its command register. Address decoder/driver 340 receives the command, decodes the address to determine the process, and places the process identifier and command onto the FIFO in command register storage 358 as described above. The command includes parameters of the transmit buffer index and the length of the communication to transmit in the format of a folded word as described above.

Command manager 356 retrieves the command from command register storage 358 as described above, identifies the transmit and release buffer command, and sends the process identifier of the requesting process 228A–C, the buffer index, and the communication length to transmit manager 366, which transmits the contents of the buffer as described above and then releases the transmit buffer.

To release the transmit buffer, transmit manager 366 scans the transmit buffer table in transmit buffer storage 370 to locate the entry containing the received process identifier, and stores an indication that the transmit buffer is not in use by any process into the located entry.

The Kernel Closes a Process

When a process 228A–C terminates, the operating system hypervisor (herein referred to as the kernel) may wish to release all resources associated with the terminating process 228A–C. To release system 200 resources associated with a terminating process 228A–C, the kernel writes a close process command to the kernel command register.

In one embodiment, the kernel is a process and has a particular process identifier; in one embodiment the kernel's process identifier is zero. The kernel process is represented by kernel 228D on FIG. 2.

The Kernel Response Register

Before writing to the kernel command register, the kernel examines the kernel response register in process storage 442A–C associated with the kernel's process in a similar manner to the way that a process 228A–C examines its command register counter. If the kernel response register is non-zero, then the kernel may write to the kernel command register. If the kernel response register is zero, then the kernel checks the kernel response register again at some later time.

The Kernel Writes to its Command Register

The kernel command register is similar to the command registers in that the kernel 228D references the kernel command register via the PCI bus interface 310 by writing to an address within the address space of master controller 214 that is dedicated to the kernel command register. In one embodiment, the kernel command register operates from the point of view of kernel 228D as if it were write-only memory: kernel 228D is allowed to write to it but attempting to read from it produces no effect. In one embodiment, the address space which includes the address of the kernel command register is protected by MMU 224 as described above, so that writing to a command register by any process 228A–D except for kernel 228D is disallowed.

PCI bus interface 310 receives the command written by kernel 228D to the kernel command register and provides the command to address decoder/driver 340. Address decoder/driver 340 receives the command (and any parameters as described below) and the address and decodes the address to identify that what was written to the kernel command register was a command.

In one embodiment, each command written to the kernel command register contains a command code and zero or more parameters contained in the data word written. In such embodiment, to close a process 228A–C, kernel 228D writes a command consisting of a command code to close a process 228A–C with a parameter of the process identifier to be closed, to the kernel command register, and address decoder/driver 340 provides this kernel command and parameter to command manager 356.

Receive and Parse the "Close Process" Command

Command manager 356 receives the kernel command and parameter, clears the kernel response register in process storage 442A–C, extracts the command code from the command, uses the command code as an index into a table stored internally within command manager 356 to identify the component of system 200 that handles the extracted command code, and signals that component with the parameter from the received kernel command. Command manager 356 clears the kernel response register in process storage 442A–C associated with the kernel by storing zeros into the kernel response register via PCI bus 212 and DMA controller 222.

When command manager 356 receives the command to close a process, command manager 356 sends the command parameter, which in this case is the process identifier of the process 228A–C to be closed, to stream manager 332 with an indication that all streams associated with that process 228A–C are to be closed. Stream manager 332 receives the process identifier, searches the process assignment table in process assignment storage 348 to locate the entry containing the received process identifier, then uses the head pointer within the process assignment table entry to locate and select the first process stream list 420 entry.

Delete Each Communication Buffer Queued to the Indicated Process

Stream manager 332 selects the communication list 440 entry referred to by the selected process stream list 420 entry, and deletes the selected communication list 440 entry and updates the receive descriptor ring in descriptor ring storage 314 as described above. Stream manager 332 uses the stream identifier from the selected process stream list 420 entry to locate the corresponding stream assignment table entry, and deletes or otherwise marks as invalid the located stream assignment table entry. Stream manager 332 retains the next entry pointer of the selected process stream list 420 entry, deletes the selected process stream list 420 entry as described above, and uses the retained next entry pointer to locate and select the next process stream list 420 entry.

Stream manager 332 continues in this manner, selecting a process stream list 420 entry, deleting all associated communication list 440 entries and the corresponding stream assignment table entry, and deleting the selected process assignment table entry, until stream manager 332 has deleted every process stream list 420 entry and every stream assignment table entry associated with the received process number, and deleted each communication list 440 entry referred to by one of the deleted process stream list 420 entries.

A Process Requests Notification when the Desired Communication or Empty Buffer is Unavailable When a process 228A–C reads from a new stream queue, a more queue, or an empty transmit buffer queue, the process may receive a reserved value, such as zero, in response to the read, signaling an error condition indicating that the requested queue is unavailable. In one embodiment, when a process 228A–C receives an indication that communications from a particular queue are unavailable, that process 228A–C may temporarily suspend its processing until certain communications are available for processing. A process 228A–C may also wish to be notified when resources such as a transmit buffer of a certain type becomes available. The process 228A–C may indicate its desire for such a notification to system 200. The process 228A–C is then signaled to resume processing once the communications for which it requested notification become available.

A Process Requests Notification when a Communication from a New Stream Becomes Available To request notification when communications from a new stream queue are available, process 228A–C writes a command to request notification when a new stream of a certain type becomes available to its command register. Command manager 356 retrieves and parses the command as described above and sends the requesting process identifier and requested stream type to sleep manager 372, which adds an entry to the new stream sleep table in sleep storage 374.

The new stream sleep table contains one entry for each process 228A–C that that has requested notification when an appropriate communication arrives. Each new stream sleep table entry contains the process identifier of the process 228A–C that requested notification, and the stream type for which the notification was requested. Sleep manager 372 receives the process identifier and stream type, forms the process identifier and stream type into an entry, and places the entry into the new stream sleep table in sleep storage 374.

Check for Sleeping Processes when a New, Unassigned Communication Arrives

Referring again to FIGS. 2, 3, and 4, during the processing of a new stream, when stream manager 332 updates the process assignment table in process assignment storage 348 to add a stream identifier and stream type list item to the entry for an unassigned process as described above, stream manager 332 sends an indication that the stream is not assigned to a process to queuing manager 336 when stream manager 332 signals queuing manager 336 to add the new communication to communication list 440 as described above. Queuing manager 336 creates and adds the new communication list 440 entry and sends the received stream type to sleep manager 372.

Signal the Process to Resume Processing

Sleep manager 372 receives the stream type and scans the new stream sleep table in sleep storage 374 looking for an entry containing the received stream type, indicating that a process has requested notification when a stream of that type is available. If sleep manager 372 finds such an entry, sleep manager 372 extracts the process identifier from the found entry, deletes the located entry from the new stream sleep table, and causes the process 228A–C associated with the extracted process identifier to resume processing. To cause a process 228A–C to resume processing, in one embodiment sleep manager 372 sends an interrupt to the process 228A–C requesting notification, and in another embodiment stores a flag into the address space accessible to the process 228A–C requesting notification.

In either of these embodiments, sleep manager 372 maintains a wakeup table in sleep storage 374. The wakeup table is constructed by initialization manager 304, with one record for each process 228A–C that might issue a notification command as described above. Each wakeup table record contains the process identifier of a process 228A–C that might issue a suspend processing command, and a process signal parameter.

In the embodiment in which sleep manager 372 sends an interrupt to cause a process 228A–C to resume processing, the process signal parameter is an interrupt code or type that is to be provided to the associated process 228A–C along with the interrupt in order to cause the process 228A–C to resume processing. In the embodiment where sleep manager 372 stores a flag into the address space of a suspended process 228A–C, the process signal parameter is the address in communication memory 232 within the address space to which the suspended process 228A–C has access, and into which sleep manager 372 is to store a value indicating the awaited for event has occurred, and the value that is to be stored. In one embodiment, some processes 228A–C use this method to receive an indication that the process should resume processing and other processes use the interrupt method.

Sleep manager 372 scans the wakeup table in sleep storage 374 until it finds the record containing the extracted process identifier, extracts either the interrupt code or the flag address and value from the found record, and either sends an interrupt along with the interrupt code, or writes the value of the flag into the flag address in communication memory 232 via PCI bus 212 and DMA controller 222.

In the embodiment in which sleep manager 372 sends an interrupt, the interrupted process 228A–C resumes processing by reading again from its new stream queue as described above. In the embodiment where sleep manager 372 writes to a flag address, the process 228A–C requesting notification periodically checks the flag, and when it detects the value written by sleep manager 372, sets the value of the flag to a different value and resumes processing by reading again from its new stream queue as described above.

A Process Requests Notification when a Communication from an Existing Stream Becomes Available To request notification when communications from an existing stream queue are available, process 228A–C writes a command to request notification when such an event occurs to its command register. Address decoder/driver 340 decodes the address as described above and places the process identifier and the command in the FIFO in command register storage 358. Command manager 356 retrieves the process identifier and the command, parses the command as described above, and sends the requesting process identifier to sleep manager 372, which receives the requesting process identifier and adds it to the existing stream sleep table in sleep storage 374. The existing stream sleep table contains the process identifier of each process 228A–C that that has requested notification when an communication from a stream assigned to that process 228A–C becomes available.

Check for Sleeping Processes when a Communication Arrives for an Existing Stream Stream/type identifier 342 identifies a communication as being a part of a stream assigned to a process 228A–C, and sends the communication to queuing manager 336 as described above. Because the communication is part of a stream assigned to the process 228A–C, queuing manager 336 adds the communication to communication list 440 as described above and scans the process assignment table in process assignment storage 348 for the process 228A–C associated with the received stream identifier. Queuing manager 336 extracts the process identifier from the process assignment table entry, and sends the extracted process identifier to sleep manager 372.

Referring again to FIGS. 2 and 3, sleep manager 372 receives the process identifier and scans the existing stream sleep table in sleep storage 374, and if it finds the received process identifier, deletes the process identifier from the existing stream sleep table and signals the associated process 228A–C, for example using a value or an interrupt as described above, so that the associated process 228A–C may resume processing communications from streams assigned to the process 228A–C as described above.

A Process Requests Notification when a Transmit Buffer of a Certain Type Becomes Available To request notification when a transmit buffer of a certain type becomes available, process 228A–C writes a command containing the type as a parameter to its command register to request notification when a transmit buffer of a certain type becomes available. Address decoder/driver 340 decodes the address as described above and places the process identifier and the command and parameter in the FIFO in command register storage 358. Command manager 356 retrieves the process identifier and retrieves and parses the command as described above and sends the requesting process identifier and transmit buffer type to sleep manager 372, which adds an entry to the transmit buffer sleep table in sleep storage 374.

The transmit buffer sleep table contains one entry for each process 228A–C that that has requested notification when a transmit buffer becomes available. Each transmit buffer sleep table entry contains the process identifier of the process 228A–C that requested notification and the transmit buffer type for which the process 228A–C requested notification. Sleep manager 372 receives the process identifier and transmit buffer type, forms the process identifier and transmit buffer type into an entry, and places the entry into the transmit buffer sleep table in sleep storage 374.

Check for Sleeping Processes when a Transmit Buffer Becomes Free

To detect when a transmit buffer becomes available, address decoder/driver 340 monitors the own bit being cleared by communication adapter 210 after a successful transmission, and provides the address to sleep manager 372 when address decoder/driver 340 updates an entry in the transmit descriptor ring with the own bit cleared due to a write received by PCI bus interface 310. As described in more detail below, sleep manager 372 looks up the transmit buffer type from the address of the buffer just transmitted and scans the transmit buffer sleep table to find any process 228A–C that might have requested that transmit buffer type, then signals that process 228A–C, for example so that it may resume processing.

Sleep manager 372 receives the transmit descriptor ring address and scans the transmit buffer table stored in transmit buffer storage 370 until it locates the entry containing the extracted transmit buffer address, and extracts the process identifier from the located transmit buffer table entry.

Sleep manager 372 scans the transmit buffer sleep table in sleep storage 374, looking for an entry containing the extracted process identifier. If found, sleep manager 372 marks the found transmit buffer sleep table entry as invalid and causes the associated process 228A–C to resume processing as described above.

System Initialization and Kernel Commands

In one embodiment, the operating system hypervisor (the kernel) running in a process 228A–C on processor system 220 may initiate, terminate, and otherwise control system 200 by means of commands written to the kernel command register as described above. In such embodiment, the kernel may at times write a run control command to the kernel command register. In one embodiment, the run control command allows the kernel to reset, stop, or start system 200; and allows the kernel to accept or refuse interactions with processor system 220.

In one embodiment, the kernel may request status by means of a command written to the kernel command register. In such embodiment, counters are maintained by various components of system 200, and the contents of these counters may be retrieved by means of a kernel command. To retrieve a counter value, the kernel reads the requested value from the kernel response register after writing to the kernel command register as described above. Command manager 356 stores the requested value into the kernel response register as described above in place of the non-zero response described above.

In one embodiment, the kernel may set various internal constants, such as base address locations and buffer sizes by means of a command written to the kernel command register. In one embodiment, the kernel may assign buffer types to buffer indexes by means of a kernel command.

Other Features

In one embodiment, master controller 214 contains a clock counter. In such embodiment, the clock counter operates in a similar manner to the new stream queue or the more queue, in that a process 228A–C may read from the clock counter via DMA controller 222 and PCI bus 212, and such a read is received by address decoder/driver 340 as described above. Address decoder/driver 340 examines the address read, and provides the clock counter contents to the requesting process. Address decoder/driver 340 increments the clock counter periodically; in one embodiment, address decoder/driver 340 updates the clock counter every millisecond.

Although DMA controller 222 is used by master controller 214 as described above, in another embodiment, master controller 214 and communication adapter 210 may have their own on-board DMA controllers, which they use in place of DMA controller 222.

Another Embodiment

More Queue is Maintained in Communication Memory

Overview

In the description above, the more queue for each process was held in master controller 214. In another embodiment, the more queue for each process is held in an area of communication memory 232 available to that process. This embodiment can reduce the load on the PCI bus because the processes can identify the next communication to process without using the PCI bus. In such embodiment, the system 200 operates as described above, with the differences noted below.

In such embodiment, within the address space available to each process in communication memory 232 is a more queue for that process. The more queue is a conventional queue, with a pointer to the head and the tail of the queue, wraps at a 32K boundary, although other boundaries may be used.

In one embodiment, instead of the folded word described above, each entry in the more queue and each entry in each communication list contains 32 bits arranged as follows:

| Bits | Contents |
|---|---|
| 0–14 | Index of buffer in which communication is stored, with low order bits truncated as described above. |
| 15–27 | Stream number of the communication or of the stream being marked. |
| 28–30 | An approximation of the byte count of the communication in the buffer. It has a value of 0 if the number of bytes in the packet are less than 32, 1 if the number of bytes is 32–63, 2 if the number of bytes is 64–127, 3 if the number of bytes is 128–255, 4 if the number of bytes is 256–511, 5 if the number of bytes is 512–1023, 6 if the number of bytes is 1024–2047 and 7 if the number of bytes is above 2047. |
| 31 | 0 means the entry in the more queue corresponds to a communication available to the process. 1 means the stream number in the more queue is being marked as invalid. This bit is not used in communication list entries. |

Upon Assignment of a Stream to a Process, Entries Corresponding to the Communications in the Stream are Installed into Communication Memory.

In the embodiment in which the more queue resides in communication memory 232, instead of new stream manager 346 providing the folded word to the process for the first entry in the communication list entry for the new stream, and updating the process assignment table with the head and tail of a process stream list, new stream manager 346 adds to the process assignment table a process stream list entry for the process that contains the identifier of the stream, but not the pointers to the communication list entry.

Instead, new stream manager 346 provides the first entry from the communication list it assigns to the process as described above, and then copies the remainder of the communication list entries for the stream that it identifies into the end of the more queue for the process to which the stream is being assigned.

In one embodiment, each process has a more queue at a fixed offset from a base address, with each process' more queue at a different offset from the other processes. There are 255 more queues, one for each process or potential process, each more queue with 32K entries of 32 bits per entry for a total of 128 K bytes. Each more queue is a circular buffer, with a head and a tail, for which the first address follows the last address.

New stream manager 346 reads the address of the tail of the queue in communication memory 232, adds entries from the communication list, beginning at that location, and then updates the tail in communication memory 232 to point to the next available location in the queue. To perform such retrieval (of the tail pointer) and such storage, new stream manager 346 signals DMA manager 380 to perform the retrieval from, and storage to, communication memory 232.

DMA manager 380 is a conventional DMA controller that receives contents to write, a starting storage address, a number of storage locations to write and a write signal, and in response, can write the contents into the number of storage addresses beginning at the starting storage address in communication memory 232. DMA manager 380 may also receive a starting address, and number of bytes and a read signal and in response, reads the number of bytes beginning with the starting address from communication memory 232.

The Process Manages its Own More Queue.

In the embodiment in which the more queue for each process resides in communication memory 232, each process 228A–228C will not request communications for a stream already assigned to it as described above. Instead, the process will retrieve the entry at the head of its more queue in communication memory and update the active head of the queue to point to the next entry in the queue.

New Communications for a Stream are Added to the More Queue in Communication Memory of the Process to which the Stream has Been Assigned.

In the embodiment in which the more queue for each process is stored in communication memory 232, when a new communication for a stream that has been assigned to a process arrives, instead of building a communication list entry and adding it to the end of the corresponding communication list, queueing manager 336 locates the process stream list entry for the stream to which the communication corresponds and identifies the process to which the stream is assigned. Queueing manager 336 then builds a more queue entry as described above, locates the tail pointer for the more queue for that process in communication memory 232, stores the more queue entry at the location indicated by the tail pointer of the more queue and updates the tail pointer of the more queue to point to the next available location.

To perform such retrieval and storage, queueing manager 336 signals DMA manager 380 to perform the retrieval from, and storage to, communication memory 232 as described above.

Communications are Made Available without Substantial Retrieval Interference.

The communications made available in the manners described herein are not only made available without the use of an operating system (either for receiving or providing the commands or communications), they are made available "without substantial retrieval interference". A communication made available "without substantial retrieval interference" allows that communication to be retrieved by a process without substantially interfering with the retrieval of other communications, except for bus contention of the memory in a multiprocessor system, in contrast, for example, to a retrieval-specific locking function.

An example of a retrieval specific locking function would be a queue lock flag, in which a process wishing to retrieve a communication pointed to by a queue of pointers shared by a number of processes would first check to see if the queue was locked (indicated by a flag) by another process, and if not, would lock it to prevent another process from attempting to access the same queue during the period in which that process was retrieving from the queue a pointer to one or more communications, and then updating the queue. When the process had retrieved the pointer to the communication from the top of the queue, the process would update the pointers used to manage the queue and then unlock the queue, making other communications pointed to by the queue available for retrieval by other processes. During the time the queue was locked, the other processes would not be able to access the queue, or the communications pointed to it. Another method of retrieving queued communications that does not involve making the communication available "without substantial retrieval interference" would be a process that receives requests for communications, and manages the queue described above. Such a process would queue additional requests for such communications if it was in the process of processing another request when the additional request or requests were received. In this case the communications corresponding to the additional requests would not be available without substantial retrieval interference because the delay in the processes receiving the additional communications would involve more than mere bus contention delays.

Communications made available "without substantial retrieval interference" do not employ a locking mechanism. Thus, in a single processor system, where bus contention among the processes isn't an issue, each process can retrieve communications that are made available without substantial retrieval interference whenever they require them, and in multiprocessor systems, communications made available without substantial retrieval interference can be available a higher percentage of the time, and the processor cycles that would otherwise be spent managing the lock and waiting for the lock to clear are available for other productive uses.

Releasing a Buffer.

In the embodiment in which the more queue for each process is maintained in communication memory 232, when a process releases a buffer, available communication locator 350 need not scan a communication list or remove an entry from a communication list corresponding to the released buffer as described above.

Reclassifications Retrieve Packets from the Buffer in Communication Memory 232 and Invalidate the Corresponding Entries in the More Queue.

In the embodiment in which the more queue for each process is stored in communication memory 232, when a process sends the command to reclassify a communication, the process writes the command with the buffer index and a compressed byte count of the communication. Reclassify manager 364 reads the communication via DMA manager 380. Because no communication list entry is used, reclassify manager 364 does not locate it or send it to queueing manager for removal from a communication list.

Stream Requeues Invalidate the Corresponding Entries in the More Queue, and They are Copied into a New Stream Queue In the embodiment in which the more queue for each process is stored in communication memory 232, if a process wishes to requeue a stream to another process, it may write a command to its command register that identifies the stream number of the stream to be requeued, and the stream type to which the stream should be requeued. Because the communications for the stream will not be in a communication list, but instead will be in the more queue of the requesting process, stream transfer manager 360 retrieves, via DMA manager 380, the more queue entries from the more queue of the requesting process beginning from the head of the more queue and builds them into a new stream list associated with the type in the request. The process stream list entry is removed and transferred to the new stream list by stream transfer manager 360 as described above, and the more queue entries are moved to a new stream list and pointers to the first and last entries are added to the added new stream list entry also by stream transfer manager 360.

After stream transfer manager 360 copies each more queue entry, it provides to queueing manager 336 an identifier of the process from which the stream was transferred and the stream number with an indication to mark the end of the stream in the more queue for that process. Queueing manager 336 builds a special more queue entry that marks the end of a stream having the number received. Queueing manager 336 then adds, via DMA manager 380, the special more queue entry to the end of the process' more queue in communication memory 232 in the same manner that it adds other more queue entries. The special more queue entry has the stream number received from stream transfer manager 360, but has bit 31 marked to indicate that communications on the more queue preceding the special entry with the same stream number as the special entry are invalid.

The process that requested such a requeue of the stream can thus distinguish between entries in its more queue that should not be treated as part of that process' more queue (such entries preceding the special entry and having the same stream number as the special entry) and those which coincidentally use the same stream number, but are, in fact, a part of a different stream for which the stream number of the former stream has been reused.

Stream Closes—a Special Entry is Used to Mark the End of the Stream

In the embodiment in which the more queue for each process is stored in communication memory 232, when a process closes a stream, instead of deleting communication list entries for the stream, stream manager 332 provides the stream number and process identifier to queueing manager 332 with an indication to mark the end of the stream in the more queue for that process. Queueing manager 332 builds a special entry and adds it to the end of the indicated process' more queue as described above to invalidate more queue entries with the same process number as that used in the special more queue entry that precede the special more queue entry in the more queue.

In one embodiment, the command contains the stream number of the stream to be closed, and therefore, stream manager 332 need not identify the stream associated with a buffer it receives as part of the command, as described above in the embodiment in which the more queue is not stored in communication memory 232 described above.

Command Registers be Maintained in Communication Memory 232.

In one embodiment, the command registers operate differently than described above, and copies of the command registers may be stored in communication memory 232 instead of communication storage 338.

A single command FIFO may in fact be used as described above, but each process 228A–228C uses its command register as if it has its own command FIFO, with a limited capacity. Thus, the process acts as if it has its own command FIFO, but in fact that need not be the case: a single command FIFO is used as described above.

When a command received from a process is retrieved from the command FIFO, command manager 356 updates the command register counter for that process by incrementing that command register counter. In one embodiment, a copy of the command register counter is stored in communication storage 338 to eliminate the need for the process 228A–228C to read it from communication memory 232. Command manager 356 retrieves and increments the copy, and it signals DMA manager 380 with the updated copy of the value of the memory location in communication memory 232 containing the counter, the address of the memory location and a write signal.

In one embodiment, a copy of each process' command register counter and certain other information described herein is stored in communication memory 232 in a block of buffers in communication memory that otherwise would be used to store an incoming communication as described above. In one embodiment, the first eight such buffers are reserved for communication between command manager 356 and processes 228A–C, although other numbers of buffers may be used or other locations may be used. This space is referred to herein as the reserved buffers. In such embodiment, descriptor ring manager 312 omits the addresses of such buffers from the list it stores in descriptor ring storage 314 so that such buffers will not be used to store communications as described above.

In one embodiment, the copy of the command register counter is four bits, but it is written into a 32 bit command register. The upper 28 bits of the command register are thus unused.

In one embodiment, a process may use the command register counter to determine whether it may send a new command and how many commands may be sent. To determine how many commands may be written without exceeding that process' allocation of pending commands, the process subtracts the value of command register counter it read from communication storage 232 prior to the last time it wrote commands, from the value of the command register counter it reads from communication memory 232 prior to sending a command, and takes the result modulo 16. The difference is the number of commands processed since the last time it checked. It then adds the number of commands it provided since the prior read of the command register counter and the number of commands that were pending for that process at the time it last read the command register. This is the number of commands pending for that process, and may be stored for the next time commands are written. The process can then subtract the number of commands pending for that process from a maximum number and write that many commands, if any.

In one embodiment, for each process, command manager 356 maintains two separate command register counters in communication memory 232 for each process, with each such counter having 32 bits. Each command register operates as described above, except that one command register counter is maintained for transmit buffer commands, referred to as the transmit command register counter, and another command register is maintained for all other commands, and is referred to as the receive command register counter.

Command manager 356 maintains the receive command register counter for each process as described above, except that transmit buffer commands do not cause command manager 356 to change the value of the receive command register counter. Instead, command manager 356 adjusts the value of the transmit command register counter in the same manner as is described above. In one embodiment, transmit buffer commands are not counted in the receive command register counter and instead counted in the transmit command register counter only if a receive bit is set in the transmit buffer command: otherwise, the transmit buffer command is counted in the receive command register counter along with other commands. The use of two command register counters allows two processes 228A–C to appear to master controller 214 as a single process, with both of them using a single command register. One of the two processes 228A–C may provide some, most or all of the transmit commands, with the other of the two processes 228A–C providing the remaining commands. If the other of the two processes 228A–C sends a transmit command (for example, to acknowledge a communication it has received), it may continue to do so, by setting the receive bit in the transmit command it provides. Because master controller 214 operates at memory speeds, the conventional bus contention mechanisms in the computer system will prevent conflicts for the same command register from occurring, eliminating the need for a locking mechanism to prevent both processes 228A–C from simultaneously using the same command register.

In one embodiment, the number of pending commands may be allocated among the two processes that share it, for example at startup to ensure that the two processes do not exceed the maximum. Each of the two processes is assigned one of the receive command register counter or the transmit command register counter. Each of the two processes performs the calculations described above on either the receive command register counter or the transmit command register counter assigned to it according to the number of pending commands from the total that had been allocated to that process. The allocation may be performed dynamically in other embodiments.

Writing Commands.

In one embodiment a process may write a command to the command register using a thirty-two bit register, or may write two commands simultaneously using a 64 bit register, such as an MMX register. Each entry in the a process' command FIFO can accommodate one command writ-ten using a 32 bit register or two commands using a 64 bit register, such as the MMX register. In this embodiment, if two commands are written via a 64 bit register, the commands are processed by command manager 356 one after the other, and command manager 356 updates the command register for the corresponding process after both commands are retrieved from an entry in the process' command FIFO.

New Stream Register Count Flag.

In one embodiment, a new stream count flag is maintained in communication memory 232 for each type of new stream to indicate whether a new stream of that type is available for a process to request. Each new stream count flag is stored in a portion of the reserved buffers (that would otherwise have been used for the first eight buffers as described above) at a specific offset from the start of that area of communication memory.

In one embodiment, new stream manager 346 increments the new stream register count flag for a type when a new stream list entry is added to an empty new stream list. This would occur when a new stream is available that has a type for which no other new stream had been available for processing at the time the new stream was queued as described above.

In one embodiment, new stream manager 346 maintains a copy of the new stream register count flag in communication storage 338. Using the type of the new stream, new stream manager 346 retrieves the new stream register count flag for that type, increments it and stores it into the copy in communication storage 338. In addition, new stream manager 346 sends the incremented copy of the new stream register count flag and the address of the actual new stream register count flag and a write signal to DMA manager 380, which replaces the existing value of the new stream register count flag using the value of the copy.

A process 228A–C may record the value of the new stream register count flag before requesting a new stream of that type as described above. When a process requests a new stream and receives a reserved value, such as zero, indicating that a new stream of the requested type is not available, the process may keep reading the value of the new stream register count flag for that type to determine whether a new stream of that type is available, rather than rerequesting a new stream. Because the new stream register count flag is in communication memory 232, the process does not need to access the relatively slower PCI bus or other I/O bus from which master controller 214 is accessible, freeing up that bus from being overwhelmed from processes that would otherwise repeatedly request new streams of that type as described above.

In still another embodiment, instead of a new stream register count flag for each type of stream, a single word, or set of words is used to indicate whether a new stream of each type is available. Each bit of the word or set of words corresponds to a different type, and if the bit for a given type is set, it indicates that a new stream is available for that type, otherwise, the bit corresponding to a type is zero to indicate that there is no new stream available for that type.

In such embodiment, new stream manager 346 maintains the word or set of words corresponding to whether a new stream is available to each type. After new stream manager 346 alters the word or set of words to correspond to the new streams available to be requested as described herein, it sends a copy of the word or set of words to DMA manager 380, which stores the word or set of words into communication storage 338. New stream manager 346 may provide the word or set of words to DMA manager 380 some time after it changes its own copy of the word or set of words to allow it to incorporate several changes at once. In one embodiment, new stream manager 346 may store the word or set of words following a change of a bit in the word or set of words from a zero to a one in an amount of time that is longer after the first such change than it takes to store the word or set of words after a change from a one to a zero, or vice versa.

A process 228A–C can retrieve the word or set of words to identify whether a new stream is available to be requested for a given type, without having to request a stream of that type.

Another Embodiment

Transmit Buffers Assigned to Processes

In one embodiment, instead of processes 228A–C requesting and releasing transmit buffers, a different block of transmit buffers is assigned to each process, and a block assigned to one process is protected from use by another process via memory management unit 224. In such embodiment, operation is as described above with the changes noted below. In one such embodiment, each transmit buffer may be is referred to by an index.

To cause a buffer to be transmitted, the process 228A–C writes to its command register a transmit buffer command, with parameters that may include the index of the transmit buffer the process 228A–C wishes to transmit.

Transmit Buffer Return Queue

In one embodiment, if a process wishes to reuse one of its transmit buffers, the process may wait for a signal that the communication it sent in the buffer was received. This signal may be an acknowledgement from the destination device that it has received the communication.

However, some communications do not provide a signal that it has been received, such as the final acknowledgement in a TCP connection. If a process 228A–C intends to provide such a communication via a transmit buffer, in one embodiment, the process 228A–C may provide the communication marked to request notification when the contents of the transmit buffer are actually sent by the network interface card. In such embodiment, the marking may be done by setting a "return bit" in the transmit buffer command used to transmit the buffer.

Command manager 356 passes the value of the return bit to transmit manager 366, which places the value of the return bit, the process identifier and the index in the transmit buffer table.

When the buffer is transmitted, address decoder/driver 340 detects that the own bit for the buffer is cleared as described above and provides the buffer index to transmit return queue manager 382. Transmit return queue manager 382 looks up the transmit buffer index in the transmit buffer table and if the return bit is set, transmit return queue manager 382 adds, via DMA manager 380, the index to the end of a transmit buffer return queue for that process that is stored in the reserved buffers. The process 228A–C can then ensure that the buffer corresponding to the index is available for reuse by using buffers corresponding to indices taken from the head of that process' transmit buffer return queue.

Communications are Made Available for Transmission without Substantial Transmission Interference.

Communications received for transmission in this fashion, as well as pointers thereto, are not only received without use of an operating system (either for receiving or providing the transmit buffer commands or communications), they are received for transmission "without substantial transmission interference." A communication received for transmission without substantial transmission interference allows that communication, or a pointer thereto, to be received from a process that wishes to transmit it without substantially interfering with the transmission of other communications, except for bus contention of the memory in a multiprocessor system. Receiving a communication for transmission, or a pointer thereto, without substantial transmission interference contrasts with receiving a communication for transmission, or a pointer thereto, using a transmission-specific locking function.

An example of a transmission-specific locking function would be a queue lock flag, in which a process wishing to transmit a communication by adding a pointer to the communication to the end of a queue of pointers shared by a number of processes would first check to see if the queue was locked (indicated by a flag) by another process, and if not, would lock it to prevent another process from attempting to access the same queue during the period in which that process was adding to the queue a pointer to the one or more communications to be transmitted, and then updating the queue. When the process had added the pointer to the communication to the end of the queue, the process would update the pointers used for managing the queue and then unlock the queue, making the queue available for other communications to be added by other processes. During the time the queue was locked, the other processes would not be able to access the queue, or add pointers to communications to it.

Communications made available for transmission, and pointers thereto or other indications of the communication, "without substantial transmission interference" do not employ a locking mechanism that each process contributing to the queue must check and manage. Thus, in a single processor system, where bus contention among the processes isn't an issue, each process can provide for transmission, communications that are made available without substantial transmission interference whenever such a communication is available, and in multiprocessor systems, communications made available for transmission without substantial transmission interference can be provided a higher percentage of the time, and the processor cycles that would otherwise be spent managing the lock and waiting for the lock to clear are available for other productive uses.

Flowchart Descriptions

Providing Communications to Processes

Figure 5A:
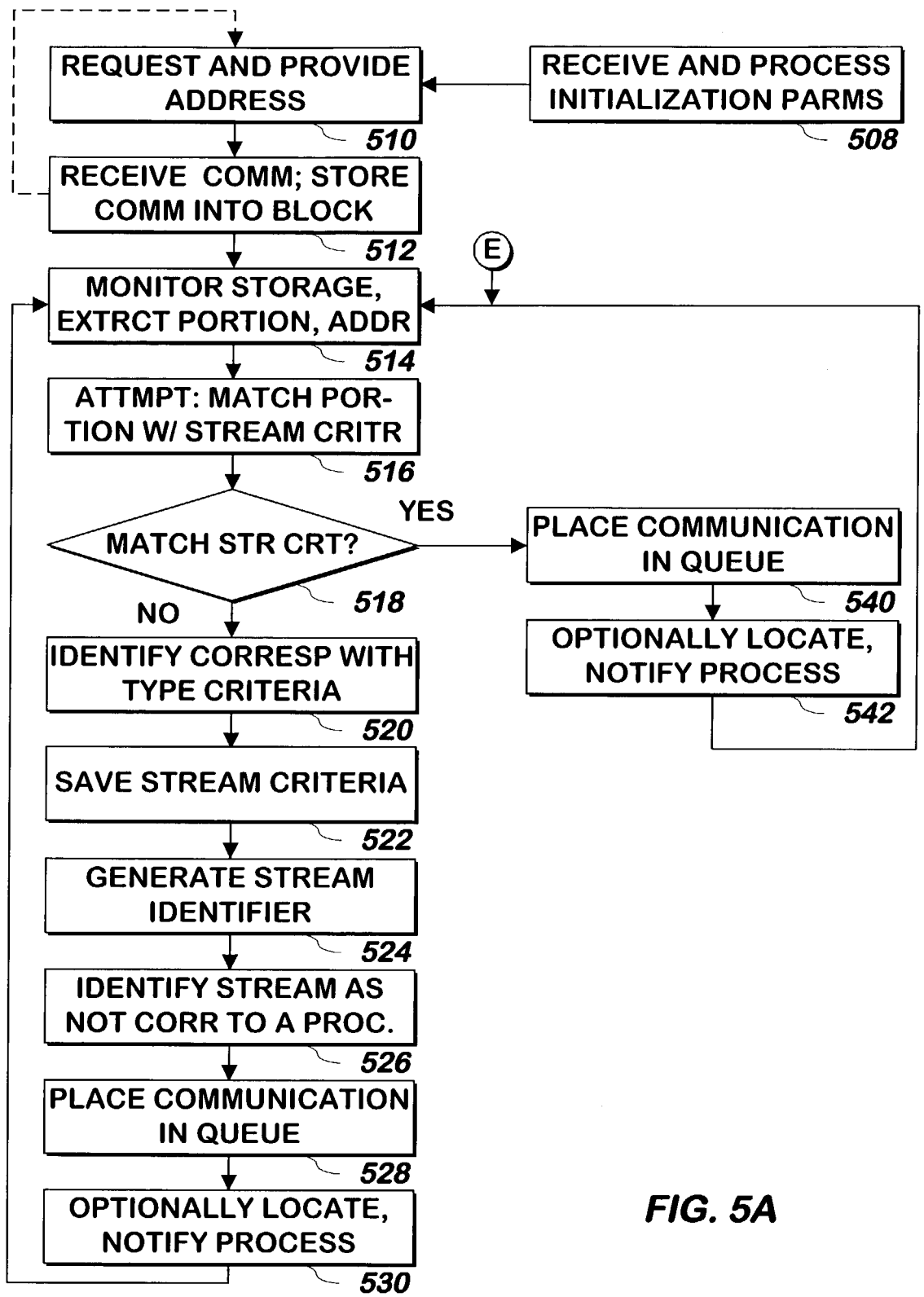
FIG. 5A is a flowchart illustrating a method of providing communications to processes according to one embodiment of the present invention.

Referring now to FIG. 5A, a flowchart illustrating a method of providing communications to processes is shown according to one embodiment of the present invention. Initialization parameters are received 508 and processed, and an address corresponding to a buffer to use to store communications is requested and provided 510 as described above. A communication is received and the communication is stored at the selected address as described above 512. In one embodiment, steps 510–512 are part of an independently running process as indicated by the dashed line in the Figure.

The storage of the communication is monitored as described above, and a five-tuple or other portion of the communication is extracted as described above 514. An attempt is made to match the portion such as the five-tuple 516 against a stream criteria as described above. If a match is identified with a stream criteria 518, the method continues at step 540. Otherwise, 518 a correspondence between the portion and a type criteria is identified 520 as described above, the portion such as the five-tuple is saved as a stream criteria 522 as described above, and a new stream identifier is generated 524 as described above. The stream corresponding to the identifier generated in step 524 is identified 526 as not assigned to a process. Step 526 may include incrementing a new stream register count flag as described above. The communication is identified as being in a queue as described above 528, a process that requested notification when the identified type of communication became available is optionally located and notified 530 as described above, and the method continues with step 514.

At step 540, the communication is identified as being in a queue as part of the stream for which the criteria corresponded as described above 540. The communication is made available without substantial retrieval interference as part of step 540 as described above. A process that requested notification when the identified stream became available is optionally located and notified 542 as described above, and the method continues with step 514.

Requesting and Receiving Communications

Figure 5B:
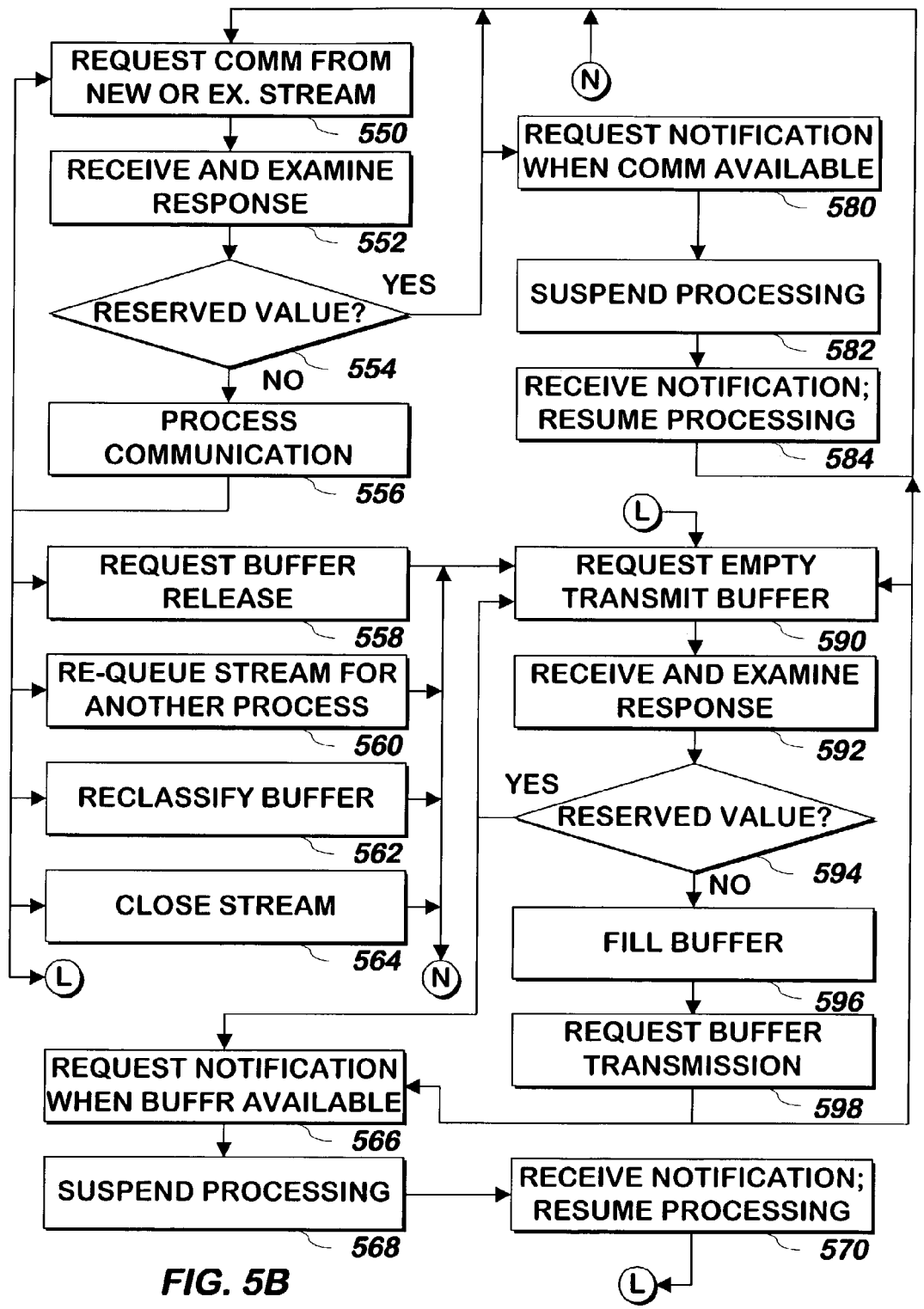
FIG. 5B is a flowchart illustrating a method of requesting and receiving communications and buffers according to one embodiment of the present invention.

Referring now to FIG. 5B, a flowchart illustrating a method of requesting and receiving communications and buffers is shown according to one embodiment of the present invention. A request is made 550 for a communication from a new stream or an existing stream, and the response is received and examined as described above 552. If the received response is a reserved value, such as zeros 554, then the method continues with step 550, or optionally with step 580.

At step 580, a request is made 580 for notification when the requested communication becomes available, as described above. Processing may be suspended 582 until such time as notification is received, at which time processing is resumed when a notification is received as described above 584, and the method continues with step 550.

Continuing now at step 554, if the received response is not a reserved value 554, then a communication is located using the response, without substantial retrieval interference, and the communication is processed 556 as described above. Once step 556 is completed, the method may continue with any of step 550, step 558, step 560, step 562, step 564, or step 590.

Continuing now with step 590, a request is made 590 for an empty transmit buffer as described above. The response is received and examined as described above 592. If the response is a reserved value 594, then the method continues with step 590 or optionally with step 566. If the response is not a reserved value 594, then the buffer is located and filled 596 as described above, a request is made 598 for the buffer to be transmitted as described above, and the method continues with step 590, step 550, or step 566. Step 598 may be performed without substantial transmission interference as described above.

At step 566, a request is made 566 for notification when a transmit buffer of a requested type is available as described above. Processing is suspended 568 until such time as notification is received, at which time processing is resumed as described above 570, and the method continues with step 590.

Continuing now with step 558, a request is made 558 to release a buffer, and the method continues with either step 550 or step 590.

Continuing now with step 560, a request is made 560 to re-queue a stream for another process, and the method continues with either step 550 or step 590.

Continuing now with step 562, a request is made 562 to reclassify a buffer, and the method continues with either step 550 or step 590.

Continuing now with step 564, a request is made 564 to close a stream, and the method continues with either step 550 or step 590.

Handling Requests for Communications and Buffers

Figure 6A:
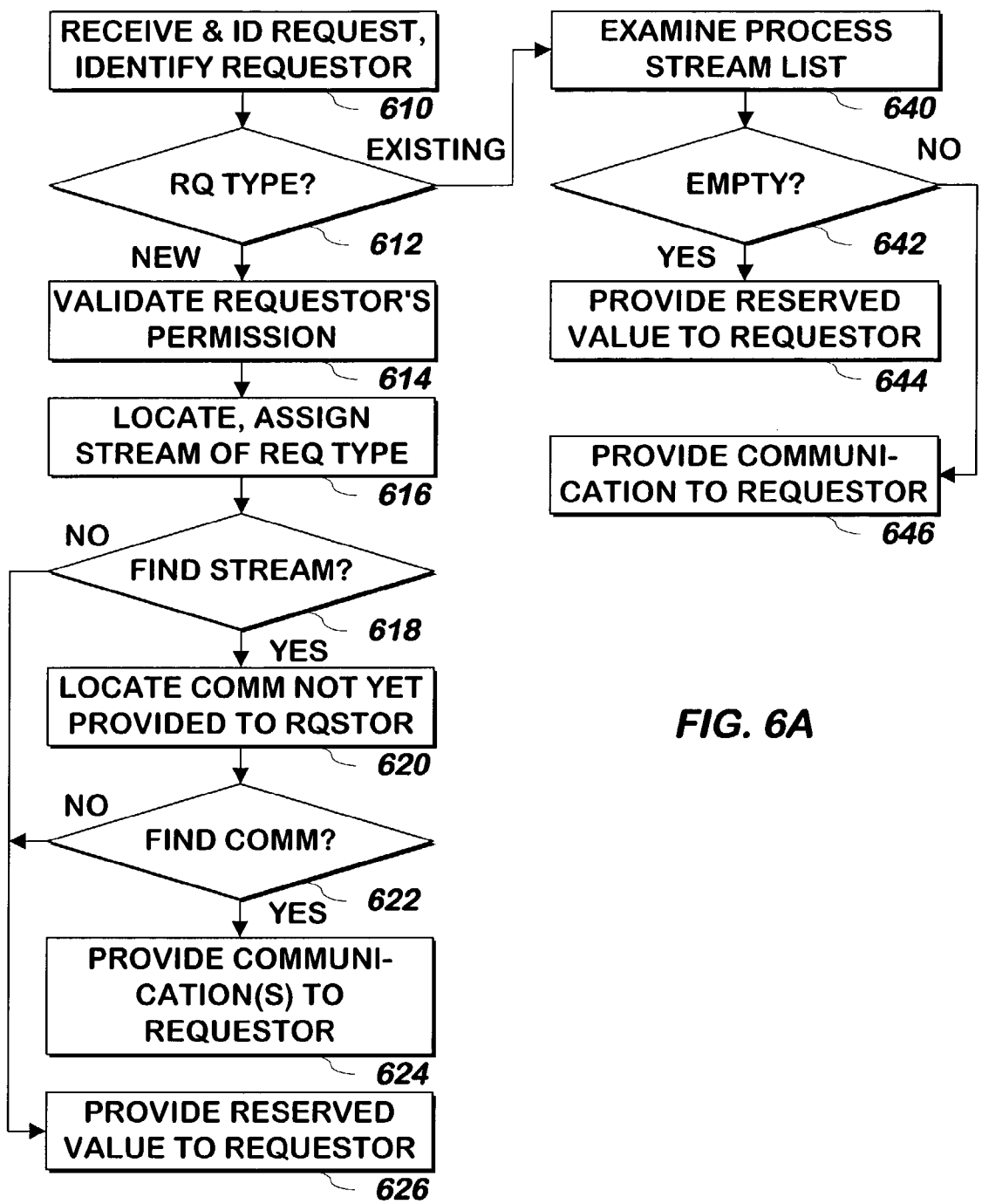
FIG. 6A is a flowchart illustrating a method of handling requests for communications and buffers according to one embodiment of the present invention.

Referring now to FIG. 6A, a flowchart illustrating a method of handling requests for communications and buffers is shown according to one embodiment of the present invention. A request is received and examined, and the identity of the requester is determined based on the address used to make the request as described above 610. If the request is for an existing stream 612, then the method continues with step 640. If the request is for a new stream 612, then the requester's permission is validated 614, and a stream, such as the oldest stream of the requested type that is not assigned to a requester is located and assigned to the requester as described above 616. If such a stream is not located 618, then a reserved value, such as zeros, is provided 626 to the requester as described above.

If such a stream is located 618, then a communication not yet provided to the requester is located 620 as described above. If no such communication is located 622, then the method continues with step 626. If such a communication is located 622, then the located communication is provided 624 to the requester as described above. Step 624 may include providing any additional communications to the end of the requestor's more queue as described above.

Continuing now with step 640, the process stream list of the requester is examined 640 to determine if any communication in streams assigned to the requesting process are available, for example, by searching for a non-stub communication as described above. If no such communication is found, then a reserved value is provided to the requester 644 as described above. Otherwise 642, the non-stub communication is provided 646 to the requester as described above.

Handling Commands

Figure 6B:
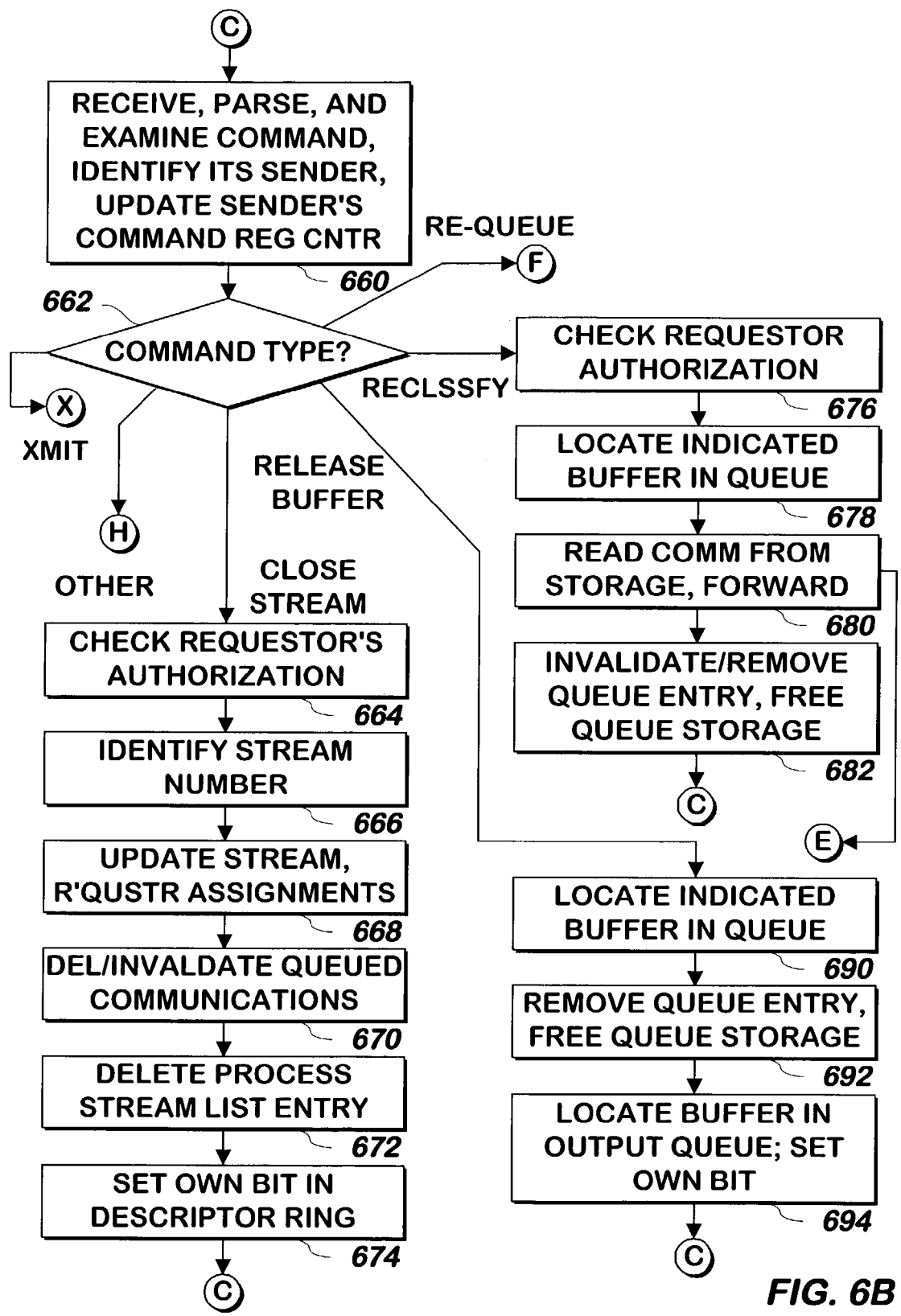
FIG. 6B is a flowchart illustrating a method of handling commands to transmit or release a buffer, re-queue a communication, or close a stream according to one embodiment of the present invention.

Referring now to FIG. 6B, a flowchart illustrating a method of handling commands to transmit or release a buffer, re-queue a communication, or close a stream is shown according to one embodiment of the present invention. The command is received, parsed, and examined as described above and the identity of the sender of the command is determined as described above 660.

Figure 8A:
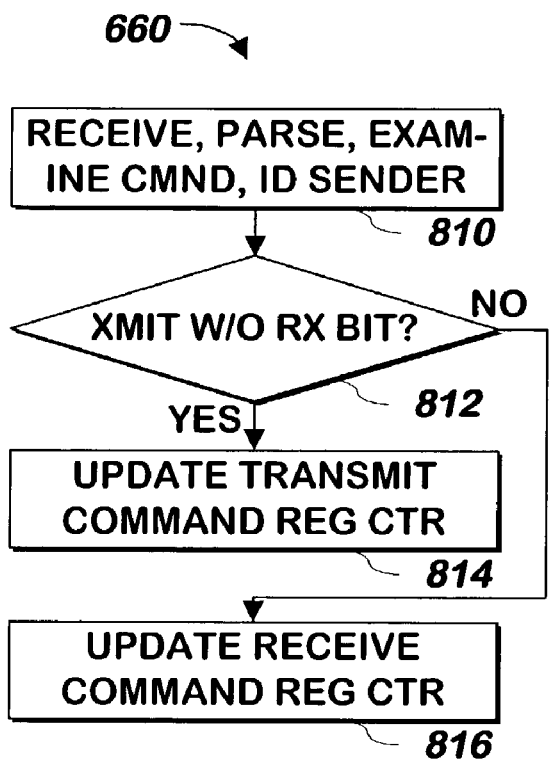
FIG. 8A is a flowchart illustrating a method of initially processing a command according to one embodiment of the present invention.

Portions of step 660 are shown in more detail in FIG. 8A. Referring momentarily to FIG. 8A, a method of initially processing a command is shown according to one embodiment of the present invention. The command is received parsed and examined as described above 810. If the command is a transmit buffer command, and the receive bit is not set as described above 812, the transmit command register counter for the process identified in step 810 is updated 814 to reflect the number of unprocessed transmit buffer commands with the receive bit not set in the process' command FIFO. The update may be performed, for example, via DMA to system memory as described above. Otherwise, the receive command register counter is updated 816 to reflect the number of unprocessed commands other than transmit buffer commands with the receive bit not set in the process' command FIFO. The update may be performed, for example, via DMA to system memory as described above.

Figure 8B:
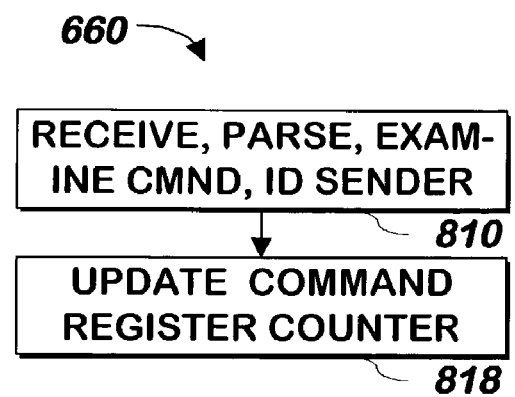
FIG. 8B is a flowchart illustrating a method of initially processing a command according to another embodiment of the present invention.

If a single command register counter is employed, the steps of FIG. 8B are used instead of the steps of FIG. 8A. FIG. 8B illustrates a method of initially processing a command according to an alternate embodiment of the present invention. Referring momentarily to FIG. 8B, the command is received parsed and examined as described above 810. A command register counter is updated 818 to reflect the number of unprocessed commands in the process' command FIFO. The update may be performed, for example, via DMA to system memory as described above.

Figure 7A:
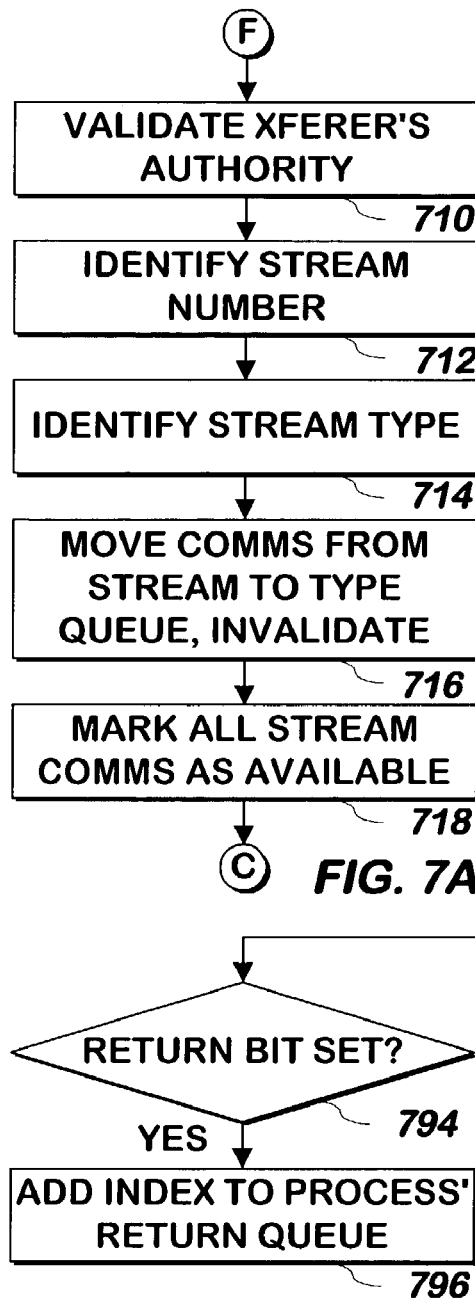
FIG. 7A is a flowchart illustrating a method of handling a command to re-queue a stream according to one embodiment of the present invention.
Figure 7B:
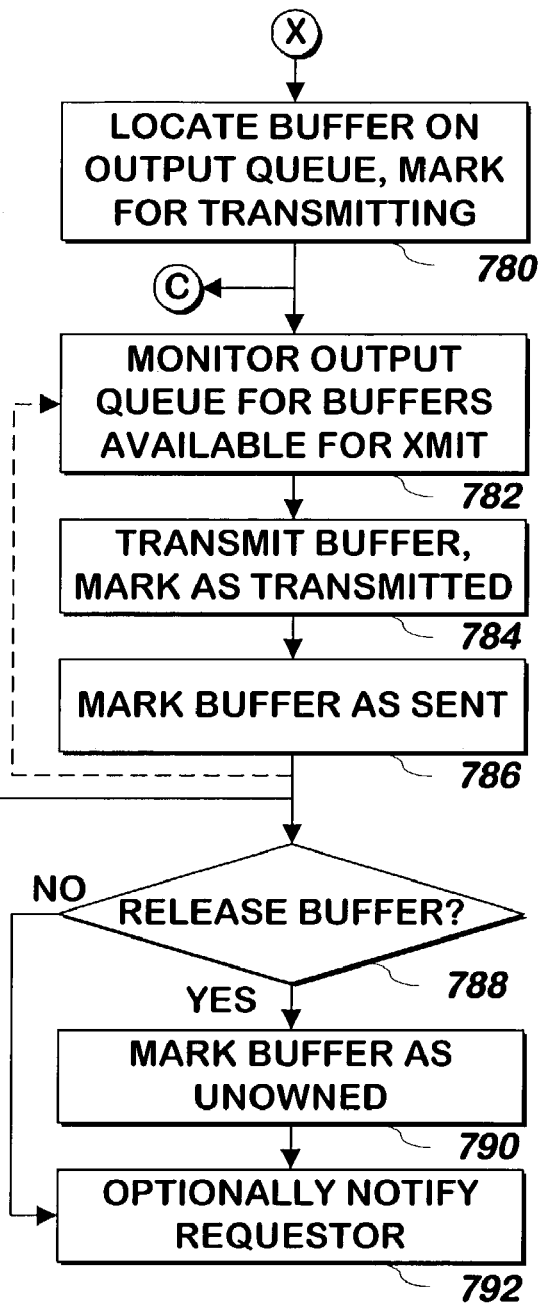
FIG. 7B is a flowchart illustrating a method of transmitting the contents of a buffer according to one embodiment of the present invention.

Referring again to FIG. 6B, if the command is a command to transmit a buffer or transmit and release a buffer 662, then the method continues with step 790 of FIG. 7B. If the command is to re-queue a communication 662, then the method continues with step 710 of FIG. 7A.

If the command is to close a stream 662, then the requester's authorization is checked 664, and an indication of the stream to close, such as the stream identifier, is identified as described above 666. Stream and requester assignments are updated 668, communications queued for the indicated stream are deleted or marked as invalid 670, the corresponding process stream list entry is deleted 672, and the corresponding descriptor ring is marked as available for use by the communication adapter 674 as described above.

If the command is a command to reclassify a buffer 662, then the requester's authorization is checked 676, and the buffer to reclassify is located in queue as described above 678. The contents of the buffer are read from storage and forwarded to be handled beginning at step 514 of FIG. 5A, and the queue entry referring to the reclassified buffer is removed from queue or invalidated 682 as described above.

If the command is to release a buffer 662, then the buffer to be released is located 690 in queue, and the entry is removed from queue or invalidated 692 as described above. The corresponding output buffer is located, such as in a descriptor ring, and ownership reassigned from the requester as described above 694.

Figure 7C:
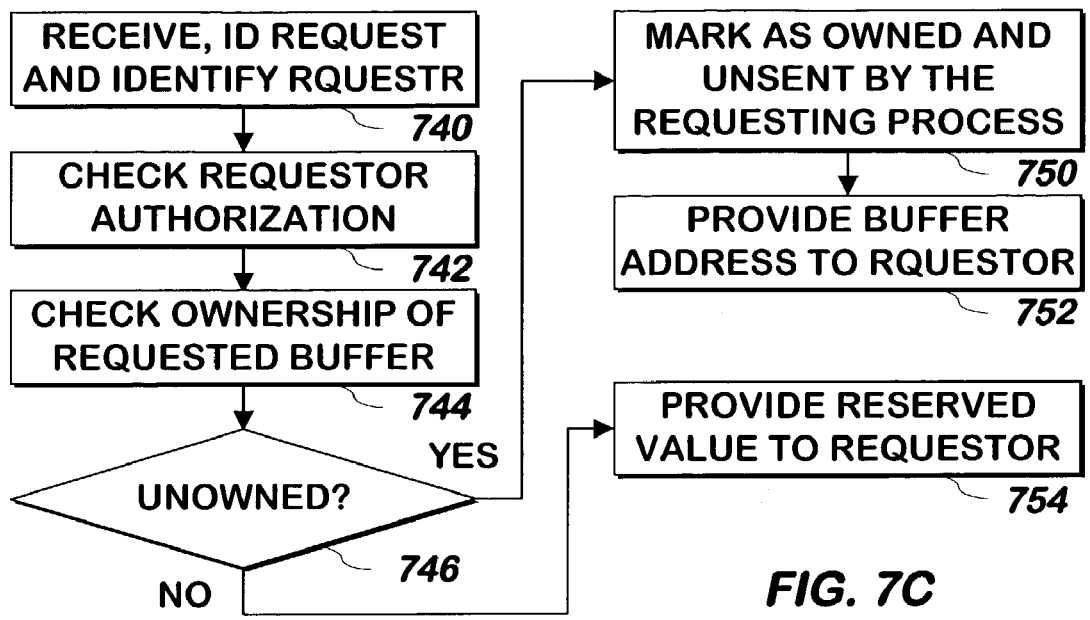
FIG. 7C is a flowchart illustrating a method of providing empty buffers upon request according to one embodiment of the present invention.
Figure 7D:
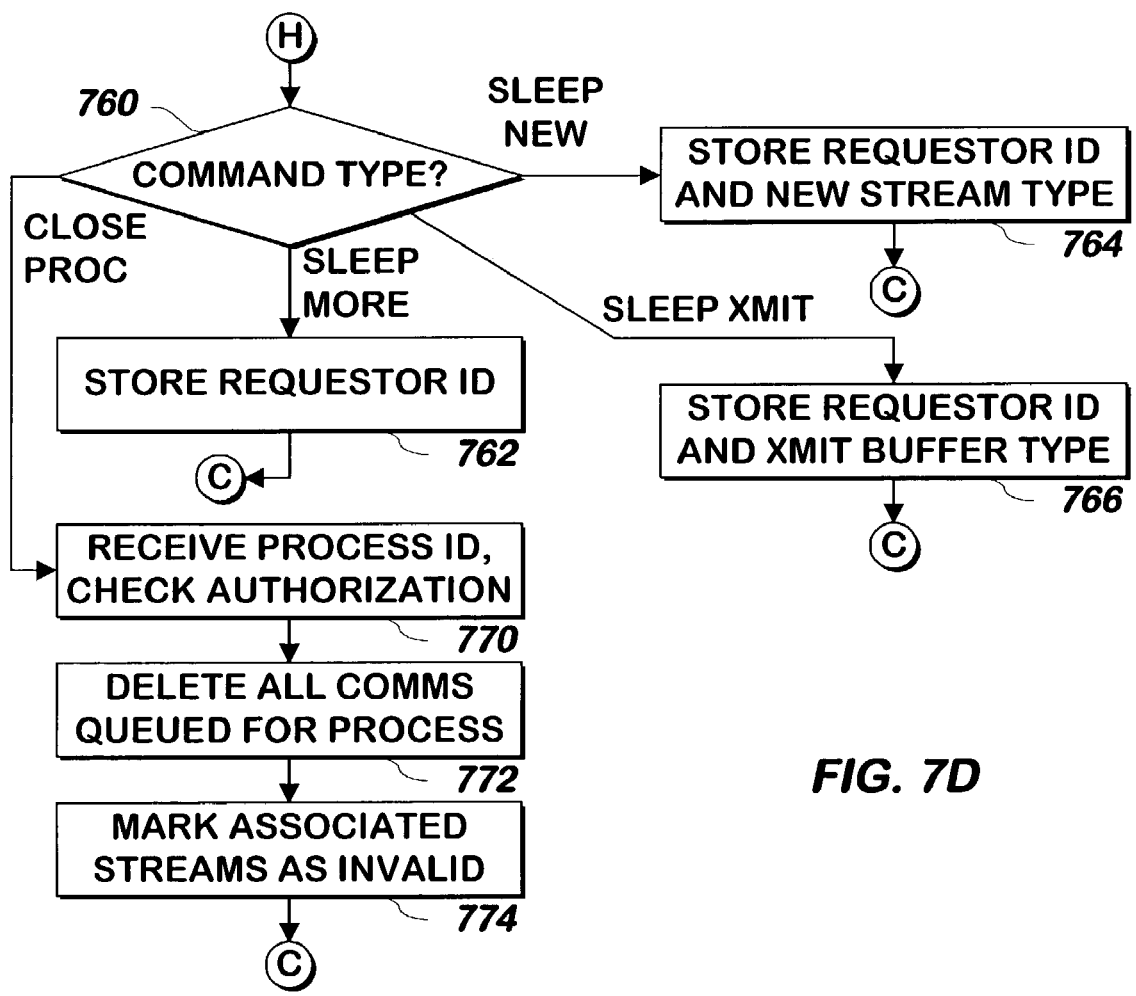
FIG. 7D is a flowchart illustrating a method of handling other commands according to one embodiment of the present invention.

If the command is none of these 662, then the method continues with step 780 of FIG. 7D.

Handling a Command to Re-Queue a Stream

Referring now to FIG. 7A, a flowchart illustrating a method of handling a command to re-queue a stream is shown according to one embodiment of the present invention. The transferer's authority is checked 710, and an indication of the stream to transfer, such as a buffer belonging to that stream, is located and the stream identifier identified as described above 712. The stream type that the indicated stream is to be transferred to is identified 714, and the communications associated with the indicated stream are transferred to the queue associated with the identified type 716, as described above. Step 716 may include invalidating the entries for the stream in the more queue of the process that requested the transfer as described above.

All communications of the indicated stream are marked 718 as being, or are otherwise made, available to be processed, irrespective of whether they have already been processed (for example, by the transferring process), as described above, and the method continues with step 660 of FIG. 6B.

Transmitting the Contents of a Buffer

Referring now to FIG. 7B, a flowchart illustrating a method of transmitting the contents of a buffer is shown according to one embodiment of the present invention. The buffer is located on the output queue and marked for transmitting 780 as described above, and the method continues with step 660 of FIG. 6B, and with step 782.

The output queue is monitored 782 for buffers available for transmission, any such buffer located is transmitted 784, and transmitted buffers are marked 786 as sent, as described above. Steps 782–786 may be implemented as a continually running process as denoted by the dashed line in the Figure.

If the request was to transmit the buffer, rather than transmit and release 788, then the method continues with step 792. Otherwise, the transmitted buffer is optionally marked 790 as unowned as described above, and any requester of notification for the type of buffer corresponding to the transmitted buffer is optionally notified 792 as described above.

If the return bit was set in the command to transmit the buffer 794, the index of the buffer is added to the transmit buffer return queue 796 as described above.

Providing Empty Buffer Upon Request

Referring now to FIG. 7C, a flowchart illustrating a method of providing empty buffers upon request is shown according to one embodiment of the present invention. The request is received and identified, and the identity of the requester is determined based on the address used to make the request as described above 740. The requester's authorization is checked 742, and the ownership of the requested buffer is checked 744 as described above.

If the requested buffer is marked as unowned 746, then the method continues with step 750. If marked as owned, then a reserved value is provided 754 to the requester as described above.

Continuing now with step 750, a buffer of the requested type is marked 750 as owned and unsent by the requesting process, and the buffer address is provided 752 to the requester as described above.

Handling Other Commands

Referring now to FIG. 7D, a flowchart illustrating a method of handling other commands is shown according to one embodiment of the present invention. If the command is to request notification when a new stream of a particular type becomes available 760, then the requester's identifier and an indication of the requested type of stream is stored as described above 764, and the method continues with step 660 of FIG. 6B.

If the command is to request notification when a transmit buffer of a particular type becomes available 760, then the requester's identifier and an indication of the requested type of transmit buffer is stored as described above 766, and the method continues with step 660 of FIG. 6B.

If the command is to request notification when a communication from an existing stream becomes available 760, then the requester's identifier is stored as described above 762, and the method continues with step 660 of FIG. 6B.

If the command is to close a process 760, then the requester's identifier is received 770 and its authority checked as described above. If authorized, all communications queued for the identified process are deleted 772, and the streams associated with the deleted communications are marked 774 invalid as described above, and the method continues with step 660 of FIG. 6B.

What is claimed is:

1. A method of managing communications over a conventional communication interface to at least one process executing on a computer system under control of an operating system, the at least one process adapted to make calls to the operating system to execute at least input/output functions, the method comprising:
providing a stream manager that makes no calls to the operating system, the stream manager performing at least the steps of:
receiving a first communication;
assigning the first communication to a first stream;
receiving a signal from a first process via memory that the first process is ready to receive communications from a stream;
assigning the first stream to the first process;
receiving subsequent communications and identifying communications having similar properties to the first communication as being part of the first stream;
assigning subsequent communications that are part of the first stream assigned to the first process to a first queue;
allowing the first process to directly access the first queue to retrieve the communications in the first queue;
receiving a second communication that does not have similar properties to the first communication;
assigning the second communication to a second stream;
receiving a signal from a second process that the second process is ready to receive communications from a stream;
assigning the second stream to the second process;
identifying subsequent communications having similar properties to the second communication as being part of the second stream;
assigning subsequent communications that are part of the second stream assigned to the second process from the manager to a second queue;
allowing the second process to directs access the second queue to retrieve the communications in the second queue;
receiving a request from the first process to provide a buffer address for a communication;
providing an address of a buffer accessible to the first process for the communication;
receiving a signal that the buffer has been filled;
providing the buffer for output; and
restricting access to the buffer so that only the first process may write to the buffer.

2. The method of managing communications of claim 1, wherein the manager further performs the steps of:
receiving a signal from the first process that the process has completed processing a communication;
reading the communication processed by the first process;
assigning the communication to a new stream; and
assigning the new stream to a new process.

3. The method of managing communications of claim 1, wherein the first process is not allowed access to the communications in the second queue.

4. The method of managing communications of claim 1, wherein the second, process is not allowed access to the communications in the first queue.

5. The method of managing communications of claim 1, wherein the communications comprise TCP/IP messages.

6. The method of managing communications of claim 1, wherein a source of a communication is a property the stream manager looks at in identifying communications having similar properties to the first communication.

7. The method of managing communications of claim 1, wherein a destination of a communication is a property the stream manager looks at in identifying communications having similar properties to the first communication.

8. The method of managing communications of claim 1, wherein a protocol of a communication is a property the stream manager looks at in identifying communications having similar properties to the first communications.

9. A system for managing communications on a conventional communication interface to a least one process executing on the system under control of an operating system, the at least one process adapted to make calls to the operating system to execute at least input/output functions, the system comprising:
   at least one processor operably connected to a memory;
   a stream manager stored in the memory, the stream manager adapted to make no calls to the operating system while performing at least the steps of:
      receiving a first communication;
      assigning the first communication to a first stream;
      receiving a signal from a first process via the memory that the first process is ready to receive communications from a stream;
      assigning the first stream to the first process;
      receiving subsequent communications and identifying communications having similar properties to the first communication as being part of the first stream;
      assigning subsequent communications that are part of the first stream assigned to the first process to a first queue;
      allowing the first process to directly access the first queue to retrieve the communications in the first queue;
      receiving a second communication that does not have similar properties to the first communication;
      assigning the second communication to a second stream;
      receiving a signal from a second process that the second process is ready to receive communications from a stream;
      assigning the second stream to the second process;
      identifying subsequent communications having similar properties to the second communication as being part of the second stream;
      assigning subsequent communications that are part of the second stream assigned to the second process from the manager to a second queue;
      allowing the second process to directly access the second queue to retrieve the communications in the second queue;
      receiving a request from the first process to provide a buffer address for a communication;
      providing an address of a buffer accessible to the first process for the communication;
      receiving a signal that the buffer has been filled;
      providing the buffer for output; and
      restricting access to the buffer so that only the first process may write to the buffer.

10. The system for managing communications of claim 9, a source of the communication is one sorting characteristic.

11. The system for managing communications of claim 9, a destination of the communication is one sorting characteristic.

12. The system for managing communications of claim 9, a protocol of the communication is one sorting characteristic.

13. The system for managing communications of claim 9, wherein the communications comprise TCP/IP messages.

* * * * *